(12) United States Patent
Bolis

(10) Patent No.: US 12,013,551 B2
(45) Date of Patent: Jun. 18, 2024

(54) STOP STRUCTURE FOR OPTICAL MODULE

(71) Applicant: Webster Capital LLC, Wilmington, DE (US)

(72) Inventor: Sébastien Bolis, Crolles (FR)

(73) Assignee: Webster Capital, LLC, Wilmington, DE (US)

( * ) Notice: Subject to any disclaimer, the term of this patent is extended or adjusted under 35 U.S.C. 154(b) by 169 days.

(21) Appl. No.: 16/335,665

(22) PCT Filed: Sep. 22, 2017

(86) PCT No.: PCT/US2017/053091
§ 371 (c)(1),
(2) Date: Mar. 21, 2019

(87) PCT Pub. No.: WO2018/057982
PCT Pub. Date: Mar. 29, 2018

(65) Prior Publication Data
US 2020/0033512 A1 Jan. 30, 2020

Related U.S. Application Data

(60) Provisional application No. 62/399,090, filed on Sep. 23, 2016.

(51) Int. Cl.
*G02B 3/00* (2006.01)
*G02B 3/14* (2006.01)
(Continued)

(52) U.S. Cl.
CPC ............ *G02B 3/14* (2013.01); *G02B 26/004* (2013.01); *G02B 26/0825* (2013.01)

(58) Field of Classification Search
CPC .... G02B 3/14; G02B 26/004; G02B 26/0825; G02B 5/005; G02B 3/12
(Continued)

(56) References Cited

U.S. PATENT DOCUMENTS 8,254,034 B1 * 8/2012 Shields .................... G02B 3/14
359/665
8,755,124 B2 * 6/2014 Aschwanden ....... G02B 26/004
359/666
(Continued)

FOREIGN PATENT DOCUMENTS

EP 2239600 A1 * 10/2010 ........... G02B 26/004
EP 2431770 3/2012
WO 2009010562 1/2009

OTHER PUBLICATIONS

Krogmann, F, et al. "A MEMS-Based Variable Micro-Lens System." Journal of Optics A: Pure and Applied Optics, vol. 8, No. 7, 2006, doi:10.1088/1464-4258/8/7/s06. (Year: 2006).*

*Primary Examiner* — James C. Jones
*Assistant Examiner* — Henry Duong
(74) *Attorney, Agent, or Firm* — Robert C. Kowert; Kowert, Hood, Munyon, Rankin & Goetzel, P.C.

(57) ABSTRACT

Various embodiments disclosed herein include an optical module. The optical module may include a deformable lens and an actuator configured to be deflectable to cause a change in the shape of the deformable lens to alter light passing through the optical module. In various examples, the optical module may include a stop structure configured to mechanically stop the actuator from deflecting beyond a threshold deflection in at least one direction. In some cases, the stop structure may be used for calibration purposes. Additionally, or alternatively, the stop structure may be configured to define an aperture stop that limits an amount of light that passes through the optical module. Furthermore, in some embodiments, the stop structure may be configured to hide the actuator when the optical module is viewed in plan.

19 Claims, 13 Drawing Sheets

(51) Int. Cl.
  *G02B 26/00*  (2006.01)
  *G02B 26/08*  (2006.01)
(58) Field of Classification Search
  USPC .......................................................... 359/665
  See application file for complete search history.

(56)  References Cited

U.S. PATENT DOCUMENTS

| | | | |
|---|---|---|---|
| 11,231,528 B2* | 1/2022 | Craen | G02B 26/0858 |
| 2005/0030438 A1* | 2/2005 | Nishioka | G02C 7/085 |
| | | | 349/21 |
| 2010/0232161 A1* | 9/2010 | Aschwanden | H04N 23/55 |
| | | | 359/666 |
| 2011/0051254 A1* | 3/2011 | Lee | G02B 3/14 |
| | | | 359/666 |
| 2014/0118605 A1* | 5/2014 | Kawamura | G02B 15/163 |
| | | | 348/345 |
| 2014/0368789 A1 | 12/2014 | Webb | |
| 2016/0216492 A1* | 7/2016 | Yun | G02B 13/0075 |
| 2017/0269341 A1* | 9/2017 | Zimmermann | G02B 13/009 |

* cited by examiner

STOP STRUCTURE FOR OPTICAL MODULE

This application is a 371 of PCT Application No. PCT/US2017/053091, filed Sep. 22, 2017, which claims benefit of priority to U.S. Provisional Patent Application No. 62/399,090, filed Sep. 23, 2016. The above applications are incorporated herein by reference. To the extent that any material in the incorporated application conflicts with material expressly set forth herein, the material expressly set forth herein controls.

BACKGROUND

Technical Field

This disclosure relates generally to optical modules, and more specifically to optical modules that may be used in high-resolution, small form factor camera systems and lens systems.

Description of the Related Art

Compact cameras are increasingly being miniaturized and integrated in devices such as smartphones and tablets. It is desirable for such cameras to capture images at high resolutions and/or image quality. However, some existing compact cameras tend to capture images at lower resolutions and/or image quality than can be achieved with larger cameras. Thus, there is a demand to continually miniaturize cameras while also increasing resolution and/or improving image quality of such cameras.

Some compact cameras may include autofocus (AF) and/or optical image stabilization (OIS) mechanisms and functionality. To provide AF, the object focal distance can be adjusted to focus an object plane or field in front of the camera at an image plane to be captured by an image sensor. As an example, a lens of the camera may move along an optical axis to achieve AF. To provide OIS, the lens of the camera may move in directions orthogonal to the optical axis to compensate for movement of the camera and/or a device that includes the camera, e.g., due to handshake.

SUMMARY OF EMBODIMENTS

Some embodiments include an optical module. The optical module may include a deformable membrane. In various embodiments, the deformable membrane may be a flexible lens element having a shape that can be changed to alter light passing through the optical module, e.g., to provide one or more optical functionalities for the optical module. For instance, the optical functionalities may include autofocus and/or optical image stabilization. The optical module may include fluid enclosed within a cavity that is at least partially defined by the deformable membrane. One or more actuator members (also referred to herein as the "actuator member") may be configured to be deflectable to cause displacement of the fluid such that at least a portion of the deformable membrane deforms to provide the optical functionalities. For instance, the actuator member may include a piezoelectric material that deflects in response to an applied voltage. Furthermore, the optical module may include one or more stop structures (also referred to herein as the "stop structure") configured to mechanically stop the actuator member from deflecting beyond a threshold deflection in at least one direction. In some examples, the actuator member may be part of an optical microelectromechanical system (MEMS) actuator. The threshold deflection may correspond to a deflection position of the actuator member in a first direction when no voltage is applied to the MEMS actuator. In some examples, application of a voltage to the actuator member may cause the actuator member to deflect in a second direction that is opposite the first direction.

According to some embodiments, at least a portion of the stop structure may be configured to define an aperture stop that limits an amount of light that passes through the optical module. In some cases, the stop structure may include a silicon substrate. Additionally, or alternatively, the stop structure may include an antireflective coating. For instance, the antireflective coating may be coated on at least a portion of the silicon substrate.

In some embodiments, the stop structure may be configured to hide the actuator member when the optical module is viewed in plan.

Some embodiments include a mobile device (e.g., a mobile multifunction device). The mobile device may include a camera. In some examples, the camera may include a photosensor, an optical module, and one or more lens elements (also referred to herein as the "lens"). The photosensor may be configured to capture light projected onto a surface of the photosensor. The optical module may include one or more flexible lens elements (also referred to herein as the "flexible lens"). In various embodiments, the flexible lens may include a deformable membrane having a shape that can be changed to provide one or more optical functionalities for the camera. For instance, the optical functionalities may include autofocus and/or optical image stabilization. The optical module may include fluid enclosed within a cavity that is at least partially defined by the flexible lens. One or more actuator members (also referred to herein as the "actuator member") may be configured to be deflectable to cause displacement of the fluid such that at least a portion of the flexible lens deforms to provide the optical functionalities. Furthermore, the optical module may include one or more stop structures (also referred to herein as the "stop structure") configured to provide one or more end stops that limit the travel of the actuator member. For instance, the stop structure may be configured to mechanically stop the actuator member from deflecting beyond a threshold deflection in at least one direction.

In some cases, the lens may be fixed within a body of the camera. Furthermore, the lens may define an optical axis. In some instances, the flexible lens may be disposed along the optical axis. Furthermore, in some examples, the lens and the flexible lens may be part of a lens system that is configured to refract light from an object field located in front of the camera to form an image of a scene at or near the surface of the photosensor. In some embodiments, the mobile device may include a display for displaying the image.

Some embodiments include a method of manufacturing an optical module. The method may include forming a stop structure of the optical module. The stop structure may be configured to define an end stop for one or more actuator members (also referred to herein as the "actuator member") of an optical microelectromechanical system (MEMS) actuator of the optical module. The end stop may provide a calibration point for calibrating an amount of deflection of the actuator member when no voltage is applied to the MEMS actuator.

In some embodiments, the method may include performing a fluid dispensing process. The fluid dispensing process may calibrate the amount of deflection of the actuator member when no voltage is applied to the MEMS actuator.

For instance, the calibration may be based at least in part on the calibration point provided by the end stop of the stop structure.

Figure 1A:
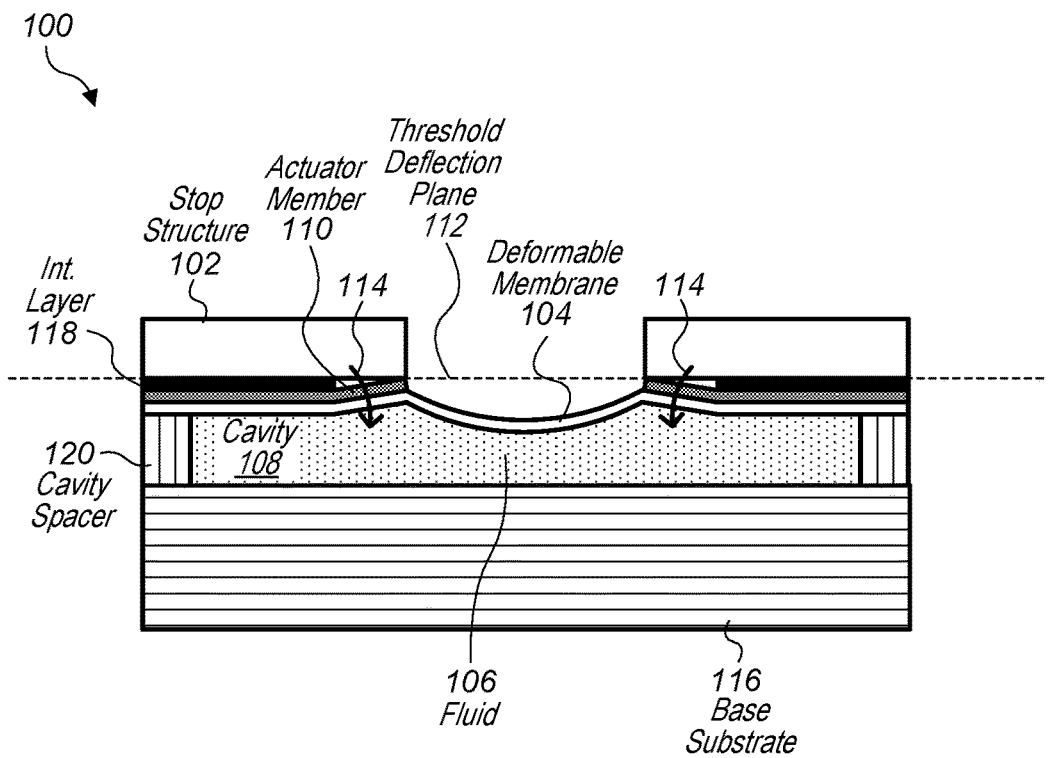
FIGS. 1A-1B each illustrate a cross-sectional view of an example optical module that includes an example stop structure, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments disclosed herein include an optical module. The optical module may include a deformable lens and an actuator configured to be deflectable to cause a change in the shape of the deformable lens to alter light passing through the optical module, e.g., to enable the deformable lens to provide one or more optical functionalities. For instance, the optical functionalities may include autofocus and/or optical image stabilization. In various examples, the optical module may include a stop structure configured to mechanically stop the actuator from deflecting beyond a threshold deflection in at least one direction. In some cases, the stop structure may be used for calibration purposes and may improve production accuracy of the optical module as compared to some other optical modules. Additionally, or alternatively, the stop structure may be configured to define an aperture stop that limits an amount of light that passes through the optical module. Furthermore, in some embodiments, the stop structure may be configured to hide the actuator when the optical module is viewed in plan.

By using the stop structure as a calibration point, the production accuracy of the optical module may be improved, which may result in an increase in the useful diopter range of the optical module and/or may allow for a more compact optical module design.

Some embodiments include an optical module. The optical module may include a deformable membrane. In various embodiments, the deformable membrane may be a flexible lens element having a shape that can be changed to provide one or more optical functionalities for the optical module. For instance, the optical functionalities may include autofocus and/or optical image stabilization. The optical module may include fluid enclosed within a cavity that is at least partially defined by the deformable membrane. One or more actuator members (also referred to herein as the "actuator member") may be configured to be deflectable to cause displacement of the fluid such that at least a portion of the deformable membrane deforms to provide the optical functionalities. For instance, the actuator member may include a piezoelectric material that deflects in response to an applied voltage. Furthermore, the optical module may include one or more stop structures (also referred to herein as the "stop structure") configured to mechanically stop the actuator member from deflecting beyond a threshold deflection in at least one direction. In some examples, the actuator member may be part of an optical microelectromechanical system (MEMS) actuator. The threshold deflection may correspond to a deflection position of the actuator member in a first direction when no voltage is applied to the MEMS actuator. In some examples, application of a voltage to the actuator member may cause the actuator member to deflect in a second direction that is opposite the first direction.

According to some embodiments, at least a portion of the stop structure may be configured to define an aperture stop that limits an amount of light that passes through the optical module. In some cases, the stop structure may include a silicon substrate. Additionally, or alternatively, the stop structure may include an antireflective coating. For instance, the antireflective coating may be coated on at least a portion of the silicon substrate.

In some embodiments, the stop structure may be configured to hide the actuator member when the optical module is viewed in plan.

In some examples, the optical module may include one or more intermediate layers (also referred to herein as the "intermediate layer") disposed between the actuator member and the stop structure. The intermediate layer may be configured to provide spacing between the actuator and the stop structure. For instance, the spacing provided by the intermediate layer may be based at least in part on the threshold deflection at which the stop structure limits the deflection of the actuator member.

In some embodiments, the optical module may include a base substrate. In some cases, the base substrate may at least partially define the cavity within which the fluid is enclosed. For instance, the base substrate may be a glass substrate.

In various examples, at least a portion of the stop structure may be planar and define a first plane. Furthermore, at least a portion of the base substrate may be planar and define a second plane that is parallel to the first plane.

Some embodiments include a mobile device (e.g., a mobile multifunction device). The mobile device may include a camera. In some examples, the camera may include a photosensor, an optical module, and one or more lens elements (also referred to herein as the "lens"). The photosensor may be configured to capture light projected onto a surface of the photosensor. The optical module may include one or more flexible lens elements (also referred to herein as the "flexible lens"). In various embodiments, the flexible lens may include a deformable membrane having a shape that can be changed to provide one or more optical functionalities for the camera. For instance, the optical functionalities may include autofocus and/or optical image stabilization. The optical module may include fluid enclosed within a cavity that is at least partially defined by the flexible lens. One or more actuator members (also referred to herein as the "actuator member") may be configured to be deflectable to cause displacement of the fluid such that at least a portion of the flexible lens deforms to provide the optical functionalities. Furthermore, the optical module may include one or more stop structures (also referred to herein as the "stop structure") configured to provide one or more end stops that limit the travel of the actuator member. For instance, the stop structure may be configured to mechanically stop the actuator member from deflecting beyond a threshold deflection in at least one direction.

In some examples, the actuator member may be part of an optical microelectromechanical system (MEMS) actuator. The threshold deflection may correspond to a deflection position of the actuator member in a first direction when no voltage is applied to the MEMS actuator. In some examples, application of a voltage to the actuator member may cause the actuator member to deflect in a second direction that is opposite the first direction.

In some cases, the lens may be fixed within a body of the camera. Furthermore, the lens may define an optical axis. In some instances, the flexible lens may be disposed along the optical axis. Furthermore, in some examples, the lens and the flexible lens may be part of a lens system that is configured to refract light from an object field located in front of the camera to form an image of a scene at or near the surface of the photosensor. In some embodiments, the mobile device may include a display for displaying the image.

According to some embodiments, at least a portion of the stop structure may be configured to define an aperture stop that limits an amount of light that passes through the optical module. In some cases, the stop structure may include a silicon substrate. Additionally, or alternatively, the stop structure may include an antireflective coating. For instance, the antireflective coating may be coated on at least a portion of the silicon substrate.

In various examples, the flexible lens may include a deformable membrane that at least partially defines a top portion of the cavity within which the fluid is enclosed. The optical module may, in some embodiments, include a base substrate that at least partially defines a bottom portion of the cavity. The bottom portion may be opposite the top portion with respect to the cavity.

In some embodiments, the flexible lens may include a first deformable membrane and a second deformable membrane.

The first deformable membrane may at least partially define a top portion of the cavity within which the fluid is enclosed. The second deformable membrane may at least partially define a bottom portion of the cavity. The bottom portion may be opposite the top portion with respect to the cavity.

According to some embodiments, the actuator member may form a first periphery configured to lead the travel of the actuator member. Furthermore, at least a portion of the stop structure may form a second periphery. The second periphery may be configured to provide a continuous, or substantially continuous, end stop that limits the travel of the actuator member. For example, the end stop of the second periphery may limit the travel of the actuator member when the first periphery of the actuator member contacts the second periphery of the stop structure.

In some examples, the stop structure may include one or more locally shaped mechanical stops. The locally shaped mechanical stops may provide one or more discrete end stops that limit the travel of the actuator member. For instance, the end stops may limit the travel of the actuator member when at least one portion of the actuator member contacts the locally shaped mechanical stops.

In some embodiments, the actuator member may be configured to deflect in a first direction when actuated. Furthermore, the one or more stop structures may be configured to limit the deflection of the actuator member in a second direction that is opposite the first direction. Additionally, or alternatively, the actuator members may be configured to deflect in a particular direction when actuated, and the stop structure may be configured to limit the deflection of the actuator member in the particular direction.

Some embodiments include a method of manufacturing an optical module. The method may include forming a stop structure of the optical module. The stop structure may be configured to define an end stop for one or more actuator members (also referred to herein as the "actuator member") of an optical microelectromechanical system (MEMS) actuator of the optical module. The end stop may provide a calibration point for calibrating an amount of deflection of the actuator member when no voltage is applied to the MEMS actuator.

In some embodiments, the method may include performing a fluid dispensing process. The fluid dispensing process may calibrate the amount of deflection of the actuator member when no voltage is applied to the MEMS actuator. For instance, the calibration may be based at least in part on the calibration point provided by the end stop of the stop structure.

In various embodiments, performing the fluid dispensing process may include initiating dispensing of a fluid into a cavity of the optical module. The cavity may be at least partially defined by a deformable membrane of the optical module. The deformable membrane may be adjacent to the actuator member. The dispensing of the fluid into the cavity may cause deflection of the actuator member towards the stop structure. For instance, the actuator may deflect based on a combination of the fluid dispensing process and the stress in the actuator member. In some examples, if the volume of the fluid dispensed into the cavity is lower than the cavity volume, then the actuator member may bend downwards. Furthermore, in some examples, if the volume of the fluid dispensed into the cavity is equal to the cavity volume, then the actuator member may be bent upwards (e.g., from a horizontal position) towards the stop structure by the stress in the actuator member.

In addition, performing the fluid dispensing process may include determining that the dispensing of the fluid has caused the actuator member to contact the stop structure. Furthermore, performing the fluid dispensing process may include terminating the dispensing of the fluid. For instance, termination of the dispensing of the fluid may occur at least partly responsive to determining that the dispensing of the fluid has caused the actuator member to contact the stop structure.

In some examples, the actuator member may be configured to be deflectable (e.g., responsive to application of a voltage to the MEMS actuator) away from the stop structure to cause displacement of the fluid such that at least a portion of the deformable membrane deforms to provide one or more optical functionalities for the optical module. For instance, the optical functionalities may include autofocus and/or optical image stabilization.

According to some embodiments, forming the stop structure may include etching a substrate (e.g., a silicon substrate) to form a desired shape of the stop structure. The desired shape of the stop structure and/or a position of the stop structure relative to the actuator member may be determined based at least in part on a desired optical power that is to be achieved by the optical module when no voltage is applied to the MEMS actuator.

In some embodiments, an optical range of the optical module may be at least five diopters.

Figure 1B:
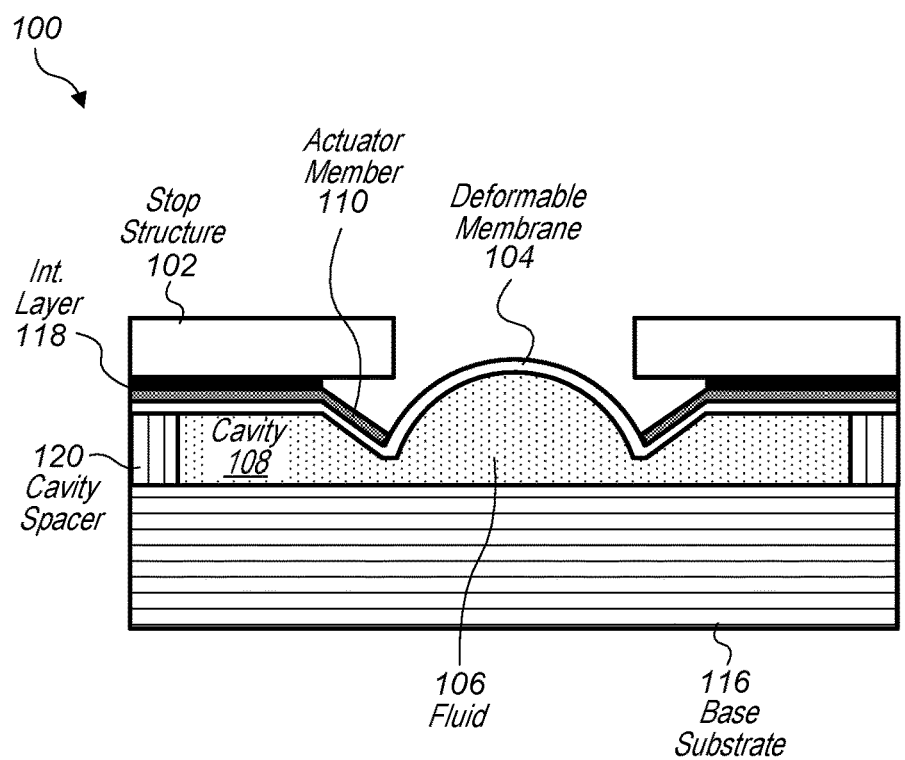

FIGS. 1A-1B each illustrate a cross-sectional view of an example optical module 100 that includes an example stop structure 102, in accordance with some embodiments. As discussed in further detail below, FIG. 1A shows the optical module 100 in a first state, and FIG. 1B shows the optical module 100 in a second state.

In some embodiments, the optical module 100 may include a deformable membrane 104. In various embodiments, the deformable membrane 104 may be a flexible lens element having a shape that can be changed to provide one or more optical functionalities for the optical module 100. For instance, the optical functionalities may include autofocus and/or optical image stabilization. The optical module 100 may include fluid 106 (e.g., an optical oil) enclosed within a cavity 108 that is at least partially defined by the deformable membrane 104. One or more actuator members 110 (also referred to herein as the "actuator member") may be configured to be deflectable to cause displacement of the fluid 106 such that at least a portion of the deformable membrane 104 deforms to provide the optical functionalities. For instance, in some embodiments, the actuator member 110 may include a piezoelectric material that deflects in response to an applied voltage. Furthermore, the optical module 100 may include one or more stop structures 102 (also referred to herein as the "stop structure") configured to mechanically stop the actuator member 110 from deflecting beyond a threshold deflection in at least one direction. For instance, the stop structure 102 may include a silicon substrate. In various embodiments, one or more surfaces of the stop structure 102 may define a threshold deflection plane 112 corresponding to the threshold deflection. The threshold deflection plane may define an end stop, provided by the stop structure 102, that limits travel of the actuator member 110 in at least one direction.

In some examples, the actuator member 110 may be part of an optical microelectromechanical system (MEMS) actuator (e.g., a piezoelectric MEMS actuator). The threshold deflection may correspond to a deflection position of the actuator member in a first direction the when no voltage is applied to the MEMS actuator. For instance, FIG. 1A illustrates an example deflection position of the actuator member 110 when deflected in the first direction. In some examples, application of a voltage to the actuator member 110 may cause the actuator member 110 to deflect in a second direction (e.g., the direction indicated by the arrow 114 in FIG. 1A) that is opposite the first direction. For instance, FIG. 1B illustrates an example deflection position of the actuator member 110 when deflected in the second direction.

In various embodiments, the optical module 100 may include a base substrate 116. For instance, the base substrate 116 may include a glass substrate. In some cases, the base substrate 116 may at least partially define the cavity 108 within which the fluid 106 is enclosed. At least a portion of the base substrate 116 may be opposite at least a portion of the deformable membrane 104 with respect to the cavity 108. Additionally, or alternatively, at least a portion of the base substrate 116 may be opposite at least a portion of the actuator member with respect to the cavity 108. In various examples, at least a portion of the base substrate 116 may be opposite at least a portion of the stop structure 102 with respect to the cavity 108.

In some examples, the optical module 100 may include one or more intermediate layers 118 (also referred to herein as the "intermediate layer"). For instance, the intermediate layer 118 may be disposed between the actuator member 110 and the stop structure 102. The intermediate layer 118 may be configured to provide spacing between the actuator member 110 and the stop structure 102. For instance, the spacing provided by the intermediate layer 118 may be based at least in part on the threshold deflection at which the stop structure 102 limits the deflection of the actuator member 102. In some examples, the intermediate layer 118 may include a structure (e.g., a substrate) dedicated to providing spacing between the actuator member 110 and the stop structure 102. Additionally, or alternatively, the intermediate layer 118 may include multiple layers of structures (e.g., substrates) disposed between the deformable membrane 104 and the stop structure 102.

In some embodiments, the optical module 100 may include one or more cavity spacers 120 (also referred to herein as the "cavity spacer"). For instance, the cavity spacer 120 may be disposed between the deformable membrane 104 and the base substrate 116. The cavity spacer 120 may be configured to provide spacing between the base substrate 116 and one or more other components (e.g., the deformable membrane) of the optical module 100. In some examples, the cavity spacer 120 may at least partially define the cavity 108.

In some non-limiting examples, the cavity 108 may be defined by the deformable membrane 104, the base substrate 116, and the cavity spacer 120. That is, the cavity 108, and the fluid within the cavity 108, may be enclosed by an enclosure defined by the deformable membrane 104, the base substrate 116, and the cavity spacer 120. At least a portion of the deformable membrane 104 may define a top portion of the enclosure. At least a portion of the base substrate 116 may define a bottom portion of the enclosure that is opposite the top portion of the enclosure with respect to the cavity 108. At least a portion of the cavity spacer 120 may define a side portion of the enclosure. In some examples, the cavity spacer 120 may extend vertically between the deformable membrane 104 and the base substrate 116.

In some embodiments, at least a portion of the stop structure 102 may be planar and define a first plane. Furthermore, at least a portion of the base substrate 116 may be planar and define a second plane that is parallel to the first plane. In various cases, the first plane and/or the second plane may be orthogonal to an optical axis. For instance, the optical axis may be defined by one or more lenses of the optical module 100 and/or one or more lenses of a camera module (e.g., the camera module 300 described below with reference to FIG. 3) that includes the optical module 100.

According to some embodiments, the first state of the optical module 100 depicted in FIG. 1A may correspond to a state in which the actuator member 110 is not actuated (or the actuator member 110 being "released"). Furthermore, the second state of the optical module 100 depicted in FIG. 1B may correspond to a state in which the actuator member 110 is actuated. In some instances, the actuator member 110 may be actuated by applying a voltage to the MEMS actuator. In some examples, the actuator member 110 may be configured to deflect away from the stop structure 102 and/or towards the base substrate 116. Such a deflection is also referred to herein as a "downward" deflection, whereas a deflection in the opposite direction (e.g., towards the stop structure 102 and/or away from the base substrate 116) is also referred to herein as an "upward" deflection.

In various embodiments, different actuation voltages (e.g., voltages applied to the MEMS actuator) may cause the actuator member 110 to deflect (e.g., downward) by different amounts. For example, a first actuation voltage may correspond to a first deflection amount (or a first deflection distance) of the actuator member 110. A second actuation voltage may correspond to a second deflection amount (or a second deflection distance) of the actuator member 110 that is different than the first deflection amount. For instance, the second actuation voltage may be greater than the first actuation voltage, and the second deflection amount may be greater than the first deflection amount. Furthermore, as discussed in further detail below with reference to FIGS. 5A-5C, different respective portions of the actuator member 110 and/or different respective actuator members 110 may be actuated with different respective actuation voltages to cause the deformable membrane 104 to change shape according to desired optical properties and/or functionality. For instance, the deformable membrane 104 may be shaped, at least partly responsive to actuation of the actuator member 110, to refract light such that the optical module 100 provides autofocus and/or optical image stabilization functionality.

As illustrated in FIG. 1A, the actuator member 110 may be in contact with the stop structure 102 when the actuator member 110 is released. In some embodiments, the stop structure 102 may be configured to prevent the actuator member 110 from deflecting upward beyond the threshold deflection plane 112 defined by the actuator member 110. As such, the stop structure 102 may serve to protect the actuator member 110 from moving beyond a safe range of motion in certain instances, e.g., drop events. Additionally, or alternatively, as described in further detail below with reference to FIGS. 6A-6B, the stop structure 102 may be used as a calibration point in a fluid dispensing process that includes dispensing the fluid 106 into the cavity 108. For instance, as the fluid 106 is dispensed into the cavity 108 (e.g., during manufacturing of the optical module 100), the increasing volume of fluid may push the deformable membrane 104 and the actuator member 110, which may be adjacent to the deformable membrane 104, towards the stop structure 102. The fluid dispensing process may involve dispensing the fluid 106 into the cavity 108 until the actuator member 110 is in contact with the stop structure 102. In this manner, the optical power of the optical module 100 when no voltage is applied to the MEMS actuator (also referred to herein as the "optical power at 0V") may be known. The stop structure 102 and other components of the optical module 102 may be configured such that using the stop structure 102 as a calibration point in such a fluid dispensing process results in a particular optical power at 0V (e.g., 1 diopter). In some examples, the optical power at 0V may be determined for an optical module 100 after the stop structure 102 is used as a calibration point in such a fluid dispensing process. By using the stop structure 102 as a calibration point, the production accuracy of the optical module 100 may be improved, which may result in an increase in the useful diopter range of the optical module 100 and/or may allow for a more compact optical module 100 design, as discussed in further detail below with reference to FIGS. 6A-6B.

Additionally, or alternatively, as discussed in further detail below with reference to FIGS. 4A-4D, in some embodiments, at least a portion of the stop structure 102 may be configured to define an aperture stop of the optical module 100. Additionally, or alternatively the stop structure 102 may be configured to hide the actuator member 110 when the optical module 100 is viewed in plan.

Figure 2A:
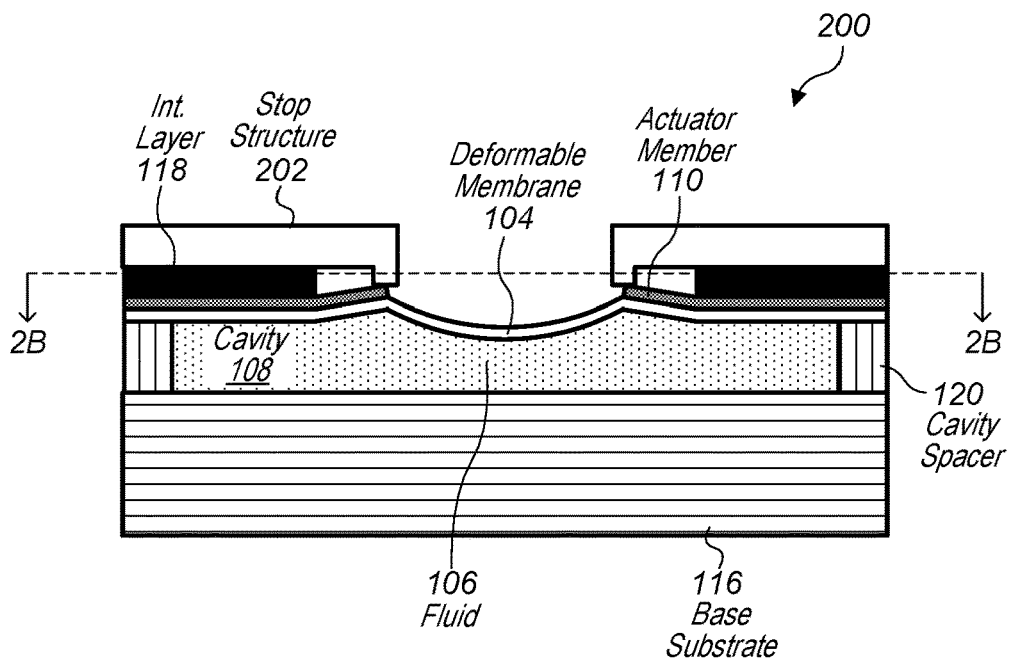
FIGS. 2A-2B each illustrate a cross-sectional view of another example optical module that includes a stop structure, in accordance with some embodiments.
Figure 2B:
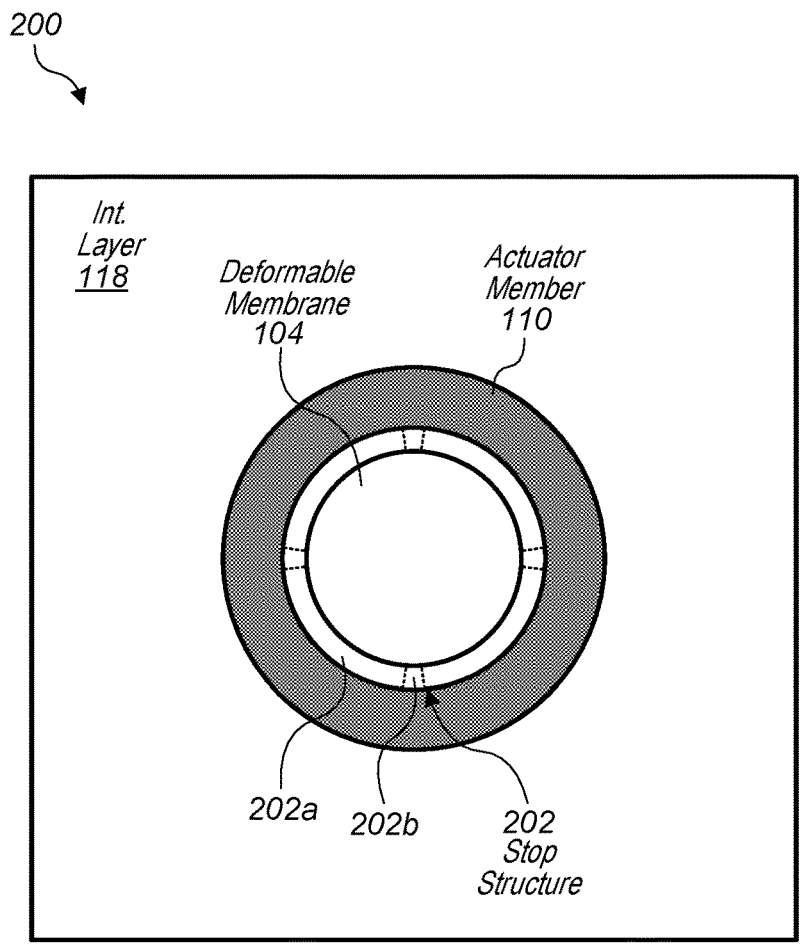

FIGS. 2A-2B each illustrate a cross-sectional view of another example optical module 200 that includes a stop structure 202, in accordance with some embodiments. FIG. 2A shows a side cross-sectional view of the optical module 200, and FIG. 2B shows a top cross-sectional view of the optical module 200 along the 2B-2B cross-section line in FIG. 2A. The stop structure 202 depicted in FIG. 2A is shaped differently than the stop structure 102 depicted in FIGS. 1A-1B.

In some embodiments, the optical module 200 may include the deformable membrane 104, the fluid 106 enclosed within the cavity 108, the actuator member 110, the base substrate 116, the intermediate layer 118, and/or the cavity spacer 120 described above with reference to FIGS. 1A-1B.

Furthermore, the optical module 200 may include one or more stop structures 202 (also referred to herein as the "stop structure") configured to mechanically stop the actuator member 110 from deflecting beyond a threshold deflection in at least one direction. In various embodiments, the stop structure 202 may be configured similar to the stop structure 102 described above with reference to FIGS. 1A-1B. However, the stop structure 202 depicted in FIG. 2A is shaped differently than the stop structure 102 depicted in FIGS. 1A-1B. In particular, as indicated in FIG. 2A, the stop structure 202 may include one or more lip portions (also referred to herein as the "lip portion") configured to mechanically stop the actuator member 110 from deflecting beyond a certain point in at least one direction. The lip portion may extend downward from a body portion of the stop structure 202. In some examples, the body portion of the stop structure 202 may define a first plane and the lip portion of the stop structure 202 may define a second plane that is orthogonal to the first plane. The first plane defined by the body portion of the stop structure 202 may be orthogonal to an optical axis, and the second plane defined by the lip portion of the stop structure 202 may be parallel to the optical axis. For instance, the optical axis may be defined by one or more lenses of the optical module 200 and/or one or more lenses of a camera module (e.g., the camera module 300 described below with reference to FIG. 3) that includes the optical module 200. It should be understood that, in various embodiments, embodiments of the optical modules described herein may include stop structures that are shaped differently than those illustrated in FIGS. 1A-2B and 4A-5C. For instance, while the stop structures are depicted in FIGS. 1A-2B and 4A-5C as having planar surfaces, the stop structures may additionally, or alternatively, have curved surfaces.

In some embodiments, e.g., as illustrated in FIG. 2B, the actuator member 110 may form a first periphery configured to lead the travel of the actuator member 110. FIG. 2B illustrates two example configurations of the stop structure 202, which will be referred to herein as the "stop structure 202a" (the first example configuration of the stop structure 202) and the "stop structure 202b" (the second example configuration of the stop structure 202). In the first configuration, at least a portion of the stop structure 202a may form a second periphery configured to provide a continuous end stop that limits the travel of the actuator member 110. For instance, the second periphery of the stop structure 202a may limit the travel of the actuator member 110 when the first periphery of the actuator member 110 contacts the second periphery of the stop structure 202a, e.g., at least partly responsive to the actuator member 110 being released from actuation or otherwise deflecting upward.

In the second configuration, the stop structure 202b may include one or more locally-shaped mechanical stops that provide one or more discrete end stops that limit the travel of the actuator member 110. For instance, the discrete end stops provided by the locally-shaped mechanical stops may limit the travel of the actuator member 110 when at least one portion of the actuator member 110 contacts the one or more locally-shaped mechanical stops. As depicted in FIG. 2B, the stop structure 202b includes four locally-shaped mechanical stops as indicated by the dashed lines. However, in various embodiments, the stop structure 202b may include fewer or more locally-shaped mechanical stops. Furthermore, in various examples, the spacing between the locally-shaped mechanical stops may be different than the spacing shown in FIG. 2B. In some cases, the number of locally-shaped mechanical stops and/or the spacing between the locally-shaped mechanical stops may be determined based at least in part on the stiffness of the actuator member 110. The example configurations indicated by the stop structure 202a and the stop structure 202b are but two example configurations. Various other stop structure configurations suitable for use with optical modules as described herein fall within the scope of this disclosure.

Figure 3:
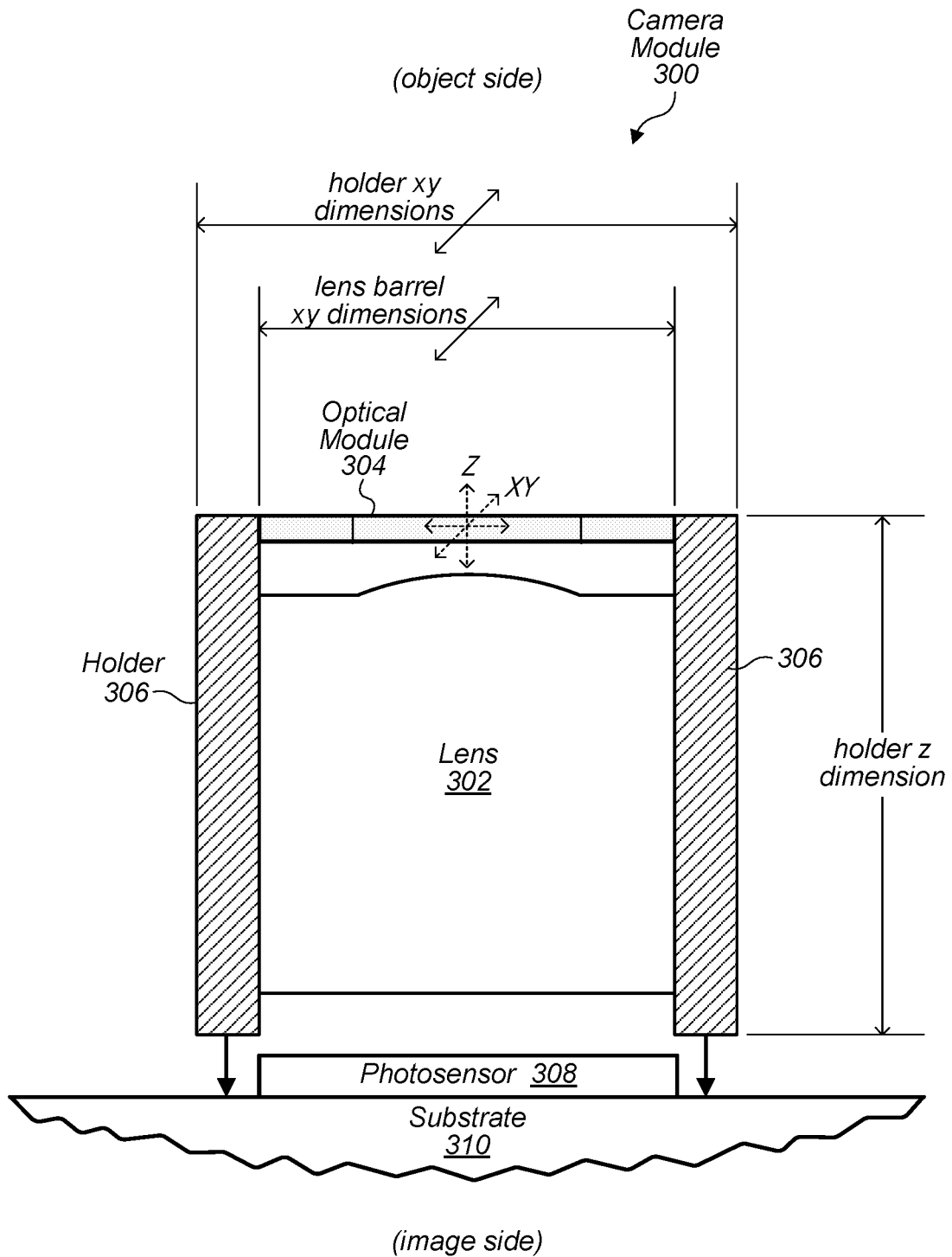
FIG. 3 illustrates a cross-sectional view of an example camera module with a lens and an optical module that provides, via a flexible lens, autofocus and/or optical image stabilization functionality for the example camera module, in accordance with some embodiments.

FIG. 3 illustrates a cross-sectional view of an example camera module 300 with a lens 302 and an optical module 304 (e.g., in accordance with one or more embodiments of the optical modules 100, 200, 400a-400d, and 500a-500c, which are described above and below with reference to FIGS. 1A-2B and 4A-5C) that provides, via a flexible lens, autofocus and/or optical image stabilization functionality (e.g., as described below with reference to FIGS. 5A-5C) for the example camera module 300, in accordance with some embodiments.

The optical module 304 may include an optical actuator, for example an optical microelectromechanical system (MEMS) actuator. The lens 302 may include one or more refractive lens elements, also referred to as a lens stack. In some cases, the lens 302 may be mounted or affixed inside a holder 306; the holder 306 and lens 302 assembly may collectively be referred to as a lens barrel. In some embodiments, the optical module 304 may be located on or within the holder 306 on the object side of the lens 302 in front of a first lens of the stack, while the photosensor 308 may be located on the image side of the lens stack when the lens barrel is attached to a substrate 310 that holds the photosensor 308. In some embodiments, the optical module 304 may include, but is not limited to, a substrate (e.g., a clear glass or plastic substrate), a deformable membrane (e.g., a flexible optical element, a flexible lens, etc.), an actuator component that is configured to change the shape of the deformable membrane to provide adaptive optical functionality for the camera without physically moving the lens barrel assembly, and a stop structure, as described in further detail above and below with reference to FIGS. 1A-2B and 4A-6B; the lens 302 and the optical module 304 may be fixed and stay stationary in the holder 306, and the assembly may be fixed to the substrate 310. In some examples, the lens 302 may define an optical axis, and the deformable membrane and/or the optical module 304 may be disposed along the optical axis. The optical functionality provided by the optical module 304 may include autofocus (AF) functionality and/or optical image stabilization (OIS) functionality, for example. The optical module 304 may also be referred to as an SSAF (Solid-State Auto-Focus) module (or component, device, or the like), a SSOIS (Solid-State Optical Image Stabilization) module (or component, device, or the like), and/or a variable focus module (or component, device, or the like). The AF and/or OIS functionality for the camera module 300 may be provided by the optical module 304 changing the shape of the deformable membrane to affect light rays passing from the object field through the deformable membrane to the lens 302, rather than by physically moving the lens barrel as in conventional AF and/or OIS cameras.

By using an optical module 304 that implements SSAF and/or SSOIS technology to provide AF and/or OIS functionality in small form factor cameras as described herein, there may no longer be a requirement to physically move the lens barrel with respect to the photosensor 308. This may have a significant impact on the X-Y size of the camera system by reducing the size of the camera module 300 in the X-Y dimensions when compared to some other camera modules.

The addition of the optical module 304 that provides SSAF and/or SSOIS functionality to the lens barrel may increase the Z dimension of the lens assembly. However, as the displacement of the lens barrel is no longer required to achieve AF functionality, a much smaller nominal distance between the lens barrel and the camera system cover window can be achieved. This may offset the majority or all of the net increase in the Z dimension due to the addition of the optical module 304.

In some embodiments of the camera module 300 as illustrated in FIG. 3, rather than including an aperture stop in the lens 302, for example at the first lens element in the lens stack, an aperture stop may be included in the optical module 304, e.g., between the base substrate and the deformable membrane of the optical module 304, or by the structure above the flexible membrane as discussed in further detail below with reference to FIGS. 4A-4D. Including the aperture stop in the optical module 304 rather than in the lens 302 may allow the optical module 304 to be smaller in the X-Y dimensions (perpendicular to the optical (Z) axis) than it would be in a similar camera with the aperture stop located in the lens 302. This may allow the X-Y dimensions of the camera module 300 to be reduced when compared to a similar camera with the aperture stop located in the lens 302. In addition, the smaller optical module 304 may be less expensive to manufacture.

Although the optical module 304 is shown in FIG. 3 as being located above the lens 302, it should be understood that in various embodiments the optical module 304 may additionally or alternatively be located below the lens 302 (e.g., on the image side of the lens 302 between the lens 302 and the photosensor 308) and/or within the lens 302. Furthermore, in some examples, the optical module 304 may be spaced apart from the holder 306.

In some embodiments, the camera module 300 may include a voice coil motor (VCM) actuator (e.g., the VCM actuator of the camera module 700 described below with reference to FIG. 7) for moving at least the lens 302 relative to the photosensor 308 to provide autofocus and/or optical image stabilization to the camera module 300. For instance, the VCM actuator may move the lens 302 along an optical axis defined by the lens 302 and/or along a plane that is orthogonal to the optical axis. The optical module 304 may be configured to complement and/or supplement the autofocus and/or optical image stabilization functionality provided to the camera module 300 by the VCM actuator.

In some embodiments, the camera module 300 may have a folded optical arrangement (not shown) in which one or more mirrors, prisms, or the likes creates one or more folds in the optical path of the camera module 300. In these instances, the lens 302 and the optical module 304 may have any suitable positioning relative to the one or more folds. In some instances, the optical module 304 may be positioned along a common optical path segment (i.e., no folds positioned between the lens 302 and the optical module 304) or along different optical path segments (i.e., at least one fold positioned between the lens 302 and the optical module 304). Additionally, it should be appreciated that the lens 302 may be divided into two or more groups that may be positioned along different optical path segments.

In some embodiments, the lens 302 and/or the optical module 304 may be independently adjustable and/or moveable (e.g., via one or more actuators) to provide various optical functionalities (e.g., zoom, focus, optical image stabilization, etc.).

Figure 4A:
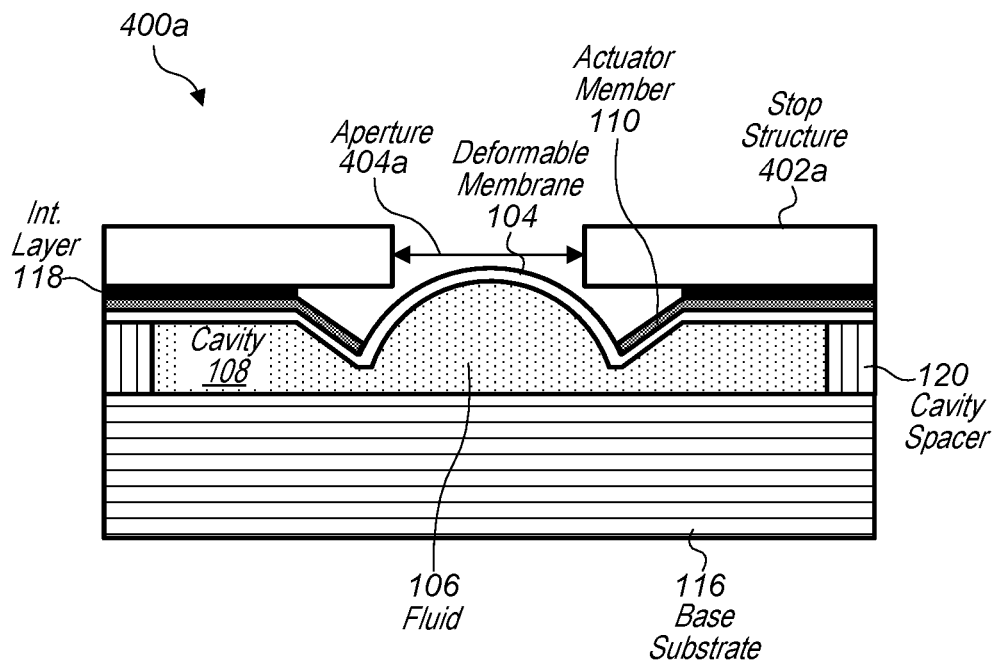
FIGS. 4A-4D each illustrate a cross-sectional view of a respective example optical module that includes a respective example stop structure that is configured to define an aperture stop, in accordance with some embodiments.

FIGS. 4A-4D each illustrate a cross-sectional view of a respective example optical module that includes a respective example stop structure that is configured to define an aperture stop, in accordance with some embodiments. FIG. 4A illustrates a cross-sectional view of an example optical module 400a that includes an example stop structure 402a that is configured to define an aperture stop, in accordance with some embodiments. In some embodiments, the optical module 400a may include the deformable membrane 104, the fluid 106 enclosed within the cavity 108, the actuator member 110, the base substrate 116, the intermediate layer 118, and/or the cavity spacer 120 described above with reference to FIGS. 1A-1B.

Furthermore, the optical module 400a may include one or more stop structures 402a (also referred to herein as the "stop structure") configured to mechanically stop the actuator member 110 from deflecting beyond a threshold deflection in at least one direction. Additionally, or alternatively, the stop structure 402a may be configured to provide an aperture stop. The aperture stop may define an aperture 404a that limits the amount of light that passes through the optical module 400a and/or through a camera module (e.g., the camera module 300 described above with reference to FIG. 3) that includes the optical module 400a. In various embodiments, the stop structure 402a may be configured similar to the stop structure 102 described above with reference to FIGS. 1A-1B. However, the stop structure 402a depicted in FIG. 4A may be shaped differently than the stop structure 102 depicted in FIGS. 1A-1B. In particular, as indicated in FIG. 4A, the stop structure 402a may extend towards the center of the optical module 400a more than the stop structure 102 extends towards the center of the optical module 100. In some examples, to define the aperture stop 404a, the stop structure 402a may be dimensioned based at least in part on an amount of light that is to pass through the optical module 400a. For instance, the lower the amount of light that is to pass through the optical module 400a, the further the stop structure 402a may extend radially towards the center of the optical module 400a.

Figure 4B:
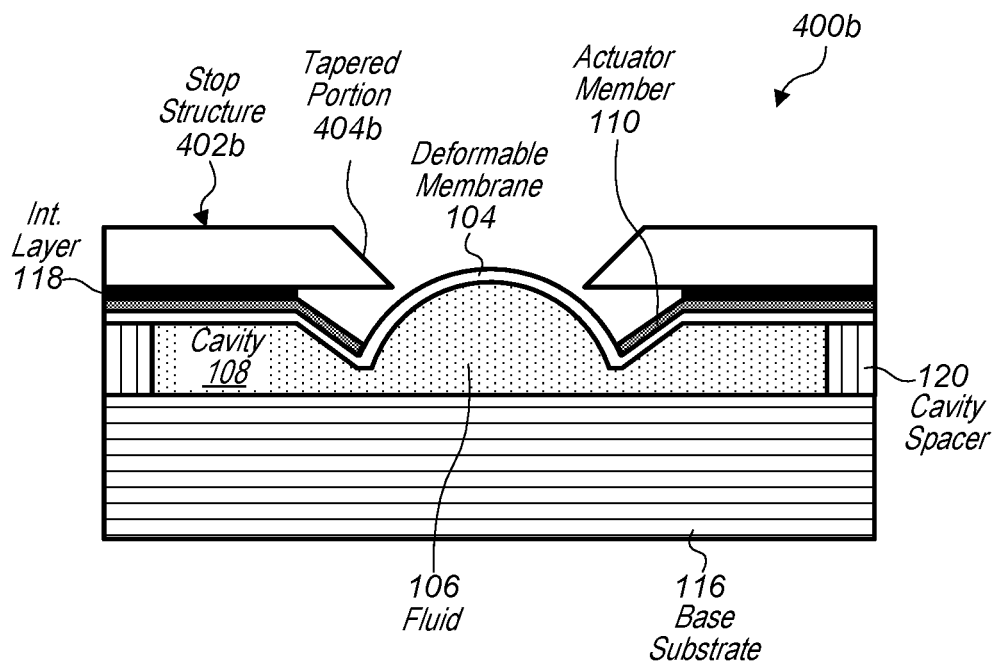

FIG. 4B illustrates a cross-sectional view of another example optical module 400b that includes an example stop structure 402b that is configured to define an aperture stop, in accordance with some embodiments. In some embodiments, the optical module 400b may include the deformable membrane 104, the fluid 106 enclosed within the cavity 108, the actuator member 110, the base substrate 116, the intermediate layer 118, and/or the cavity spacer 120 described above with reference to FIGS. 1A-1B.

Furthermore, the optical module 400a may include one or more stop structures 402b (also referred to herein as the "stop structure") configured to mechanically stop the actuator member 110 from deflecting beyond a threshold deflection in at least one direction. Additionally, or alternatively, the stop structure 402b may be configured to provide an aperture stop. The aperture stop may define an aperture that limits the amount of light that passes through the optical module 400b and/or through a camera module (e.g., the camera module 300 described above with reference to FIG. 3) that includes the optical module 400b. In various embodiments, the stop structure 402b may be configured similar to the stop structure 102 described above with reference to FIGS. 1A-1B. However, the stop structure 402b depicted in FIG. 4B may be shaped differently than the stop structure 102 depicted in FIGS. 1A-1B. In particular, as indicated in FIG. 4B, the stop structure 402b may extend towards the center of the optical module 400b more than the stop structure 102 extends towards the center of the optical module 100. Furthermore, the stop structure 402b depicted in FIG. 4B may be shaped differently than the stop structure 402a depicted in FIG. 4A. For instance, as depicted in FIG. 4B, the stop structure 402b may include a tapered portion 404b that narrows as the stop structure 402b extends towards the center of the optical module 400b.

Figure 4C:
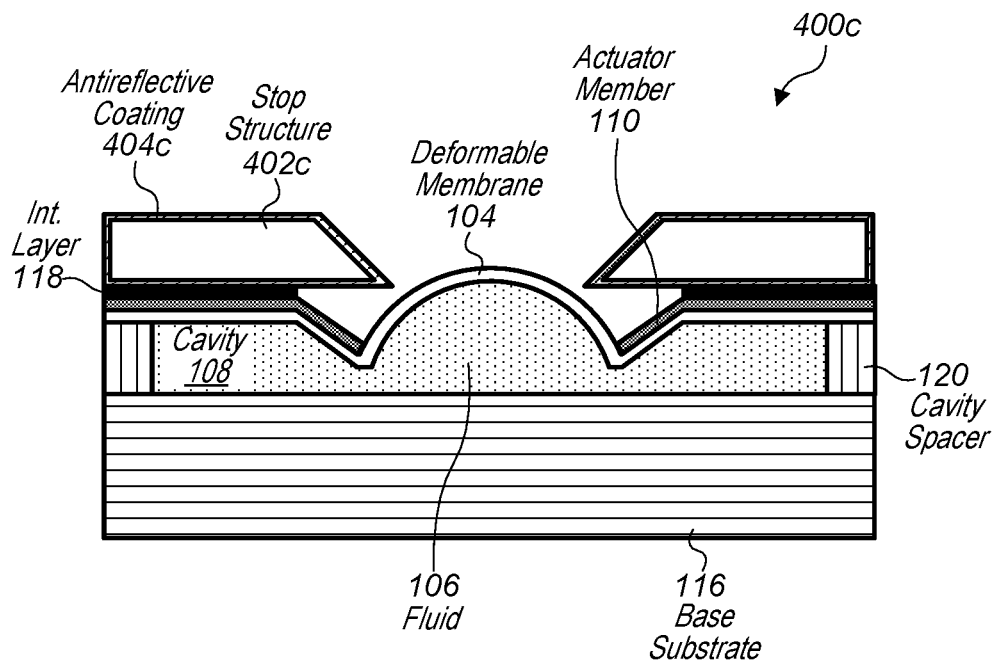

FIG. 4C illustrates a cross-sectional view of yet another example optical module 400c that includes an example stop structure 402c that is configured to define an aperture stop, in accordance with some embodiments. In some embodiments, the optical module 400c may include the deformable membrane 104, the fluid 106 enclosed within the cavity 108, the actuator member 110, the base substrate 116, the intermediate layer 118, and/or the cavity spacer 120 described above with reference to FIGS. 1A-1B.

Furthermore, the optical module 400a may include one or more stop structures 402c (also referred to herein as the "stop structure") configured to mechanically stop the actuator member 110 from deflecting beyond a threshold deflection in at least one direction. Additionally, or alternatively, the stop structure 402b may be configured to provide an aperture stop. The aperture stop may define an aperture that limits the amount of light that passes through the optical module 400c and/or through a camera module (e.g., the camera module 300 described above with reference to FIG. 3) that includes the optical module 400c. In various embodiments, the stop structure 402c may be configured similar to the stop structure 102 described above with reference to FIGS. 1A-1B. However, the stop structure 402c depicted in FIG. 4C may be shaped differently than the stop structure 102 depicted in FIGS. 1A-1B. In particular, as indicated in FIG. 4C, the stop structure 402c may extend towards the center of the optical module 400c more than the stop structure 102 extends towards the center of the optical module 100. Furthermore, the stop structure 402b depicted in FIG. 4B may be shaped differently than the stop structure 402a depicted in FIG. 4A. For instance, as depicted in FIG. 4B, the stop structure 402b may include a tapered portion 404b that narrows as the stop structure 402b extends towards the center of the optical module 400b.

According to various embodiments, the stop structure 402c may include an antireflective coating 404c. In some examples, the stop structure 402c may include a silicon substrate with a high reflectance, and the antireflective coating 402c may include one or more antireflective substances coated on at least a portion of the silicon substrate to mitigate undesired reflection of light by the silicon substrate. In some cases, the antireflective coating may include one or more thin films with alternating layers of contrasting refractive index.

Figure 4D:
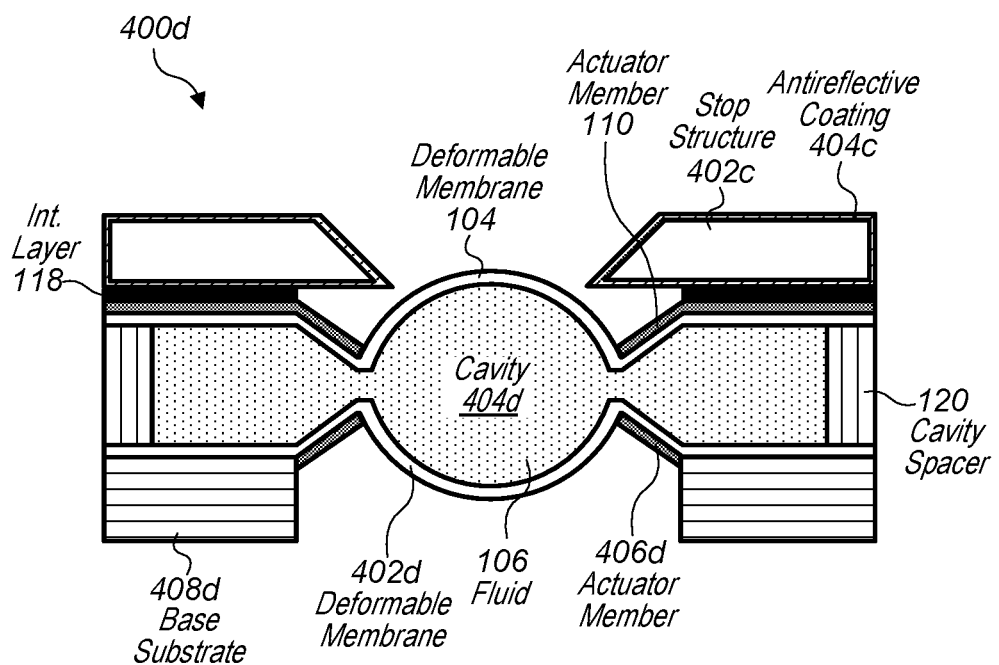

FIG. 4D illustrates a cross-sectional view of still yet another example optical module 400d that includes an example stop structure 402c that is configured to define an aperture stop, in accordance with some embodiments. In some embodiments, the optical module 400d may include the deformable membrane 104, the fluid 106 enclosed within a cavity, the actuator member 110, the intermediate layer 118, and/or the cavity spacer 120 described above with reference to FIGS. 1A-1B. In some cases (e.g., as depicted in FIG. 4D), the optical module 400d may include the stop structure 402c described above with reference to FIG. 4C. However, in various embodiments, the optical module 400d may include other stop structure configurations, e.g., in accordance with one or more embodiments of the stop structures described above and below with reference to FIGS. 1A-2B, 4A-4C, and 5A-5C.

In some embodiments, the deformable membrane 104 may be a first deformable membrane 104, and the optical module 400d may include a second deformable membrane 402d. The first deformable membrane 104 and the second deformable membrane 402d may at least partially define a cavity 404d within which the fluid 106 is enclosed. In some examples, at least a portion of the second deformable membrane 402d may be opposite the first deformable membrane 104 with respect to the cavity 404d. In some embodiments, the cavity 404d, and the fluid 106 within the cavity 404d, may be enclosed by an enclosure defined by the first deformable membrane 104, the second deformable membrane 402d, and the cavity spacer 120. At least a portion of the first deformable membrane 104 may define a top portion of the enclosure. At least a portion of the second deformable membrane 402d may define a bottom portion of the enclosure that is opposite the top portion of the enclosure with respect to the cavity 404d. At least a portion of the cavity spacer 120 may define a side portion of the enclosure. In some examples, the cavity spacer 120 may extend vertically between the first deformable membrane 104 and the second deformable membrane 402d.

In some examples, the actuator member 110 may be a first actuator member 110, and the optical module 400d may include a second actuator member 406d. The second actuator member 406d may be configured to be deflectable to cause displacement of the fluid 106 such that at least a portion of the second deformable membrane 402d deforms to provide optical functionalities such as autofocus and/or optical image stabilization functionality. For instance, in some embodiments, the second actuator member 406d may include a piezoelectric material that deflects in response to an applied voltage.

In various embodiments, the optical module 400d may include a base substrate 408d. For instance, the base substrate 408d may include a glass substrate. At least a portion of the base substrate 408d may be opposite at least a portion of the first deformable membrane 104 with respect to the cavity 404d. Additionally, or alternatively, at least a portion of the base substrate 408d may be opposite at least a portion of the first actuator member 110 with respect to the cavity 404d. In various examples, at least a portion of the base substrate 408d may be opposite at least a portion of the stop structure 402c with respect to the cavity 404d. In some examples, the base substrate 408d may be configured to provide an anchor point for the second actuator member 406d. Similarly, in some examples, the intermediate layer 118, the cavity spacer 120, or the stop structure 402c may be configured to provide an anchor point for the first actuator member 110. In some embodiments, the base substrate 408d may provide structural support for the second deformable membrane 402d and/or the optical module 400d.

Figure 5A:
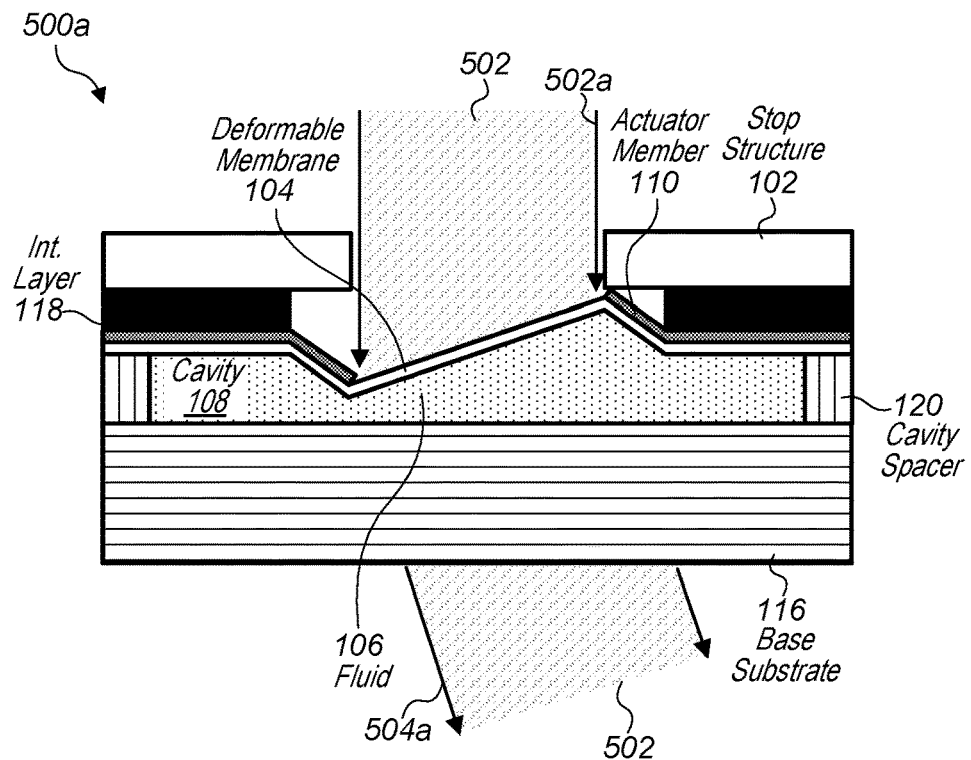
FIG. 5A illustrates a cross-sectional view of an example optical module having a deformable membrane that has been deformed to a state in which the optical module may provide optical image stabilization functionality, in accordance with some embodiments. The example optical module of FIG. 5A includes an example stop structure, in accordance with some embodiments.

FIG. 5A illustrates a cross-sectional view of an example optical module 500a having a deformable membrane 104 that has been deformed to a state in which the optical module 500a may provide optical image stabilization functionality, in accordance with some embodiments. In various examples, the optical module 500a may be configured in accordance with one or more embodiments of the optical modules 100, 200, and 400a-400d described above with reference to FIGS. 1A-2B and 4A-4D). For instance, in some embodiments, the optical module 500a may include the deformable membrane 104, the fluid 106 enclosed within the cavity 108, the actuator member 110, the stop structure 102, the base substrate 116, the intermediate layer 118, and/or the cavity spacer 120 described above with reference to FIGS. 1A-1B.

In some examples, light 502 may enter the optical module 500a (e.g., from the top and/or object side of the optical module 500a) as indicated in FIG. 5A by the first set of arrows 502a. At least a portion of the actuator member 110 may be actuated such that the resulting deflection of the actuator member 110 causes the deformable membrane 104 to be shaped to provide optical image stabilization functionality. For instance, a first portion of the actuator member 110 may be actuated such that it deflects downward and a second portion may be released such that it is in contact with the stop structure 102. The resulting shape of the deformable membrane 104 may refract light passing through the deformable membrane 104 such that the light exits the optical module 500a (e.g., from the bottom and/or image side of the optical module 500a) as indicated in FIG. 5A by the second set of arrows 504a. In some examples, the second set of arrows 504a may indicate a shift in the path of the light 502 relative to a photosensor (e.g., the photosensor 308 described above with reference to FIG. 3 and/or the image sensor 724 described below with reference to FIG. 7) that may compensate for a movement of a camera module (e.g., the camera module 300 described above with reference to FIG. 3 and/or the camera module 700 described below with reference to FIG. 7) that includes the optical module 500a.

Figure 5B:
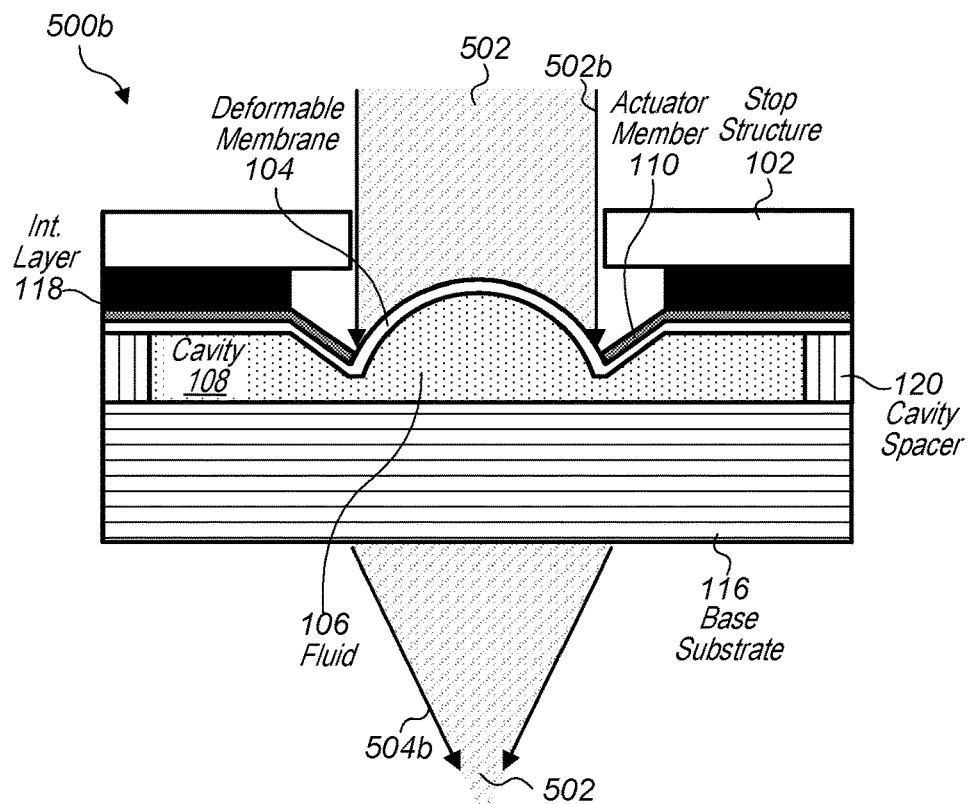
FIG. 5B illustrates a cross-sectional view of an example optical module having a deformable membrane that has been deformed to a state in which the optical module may provide autofocus functionality, in accordance with some embodiments. The example optical module of FIG. 5B includes an example stop structure, in accordance with some embodiments.

FIG. 5B illustrates a cross-sectional view of an example optical module 500b having a deformable membrane 104 that has been deformed to a state in which the optical module may provide autofocus functionality, in accordance with some embodiments. In various examples, the optical module 500b may be configured in accordance with one or more embodiments of the optical modules 100, 200, and 400a-400d described above with reference to FIGS. 1A-2B and 4A-4D). For instance, in some embodiments, the optical module 500b may include the deformable membrane 104, the fluid 106 enclosed within the cavity 108, the actuator member 110, the stop structure 102, the base substrate 116, the intermediate layer 118, and/or the cavity spacer 120 described above with reference to FIGS. 1A-1B.

In some examples, light 502 may enter the optical module 500b (e.g., from the top and/or object side of the optical module 500b) as indicated in FIG. 5B by the first set of arrows 502b. At least a portion of the actuator member 110 may be actuated such that the resulting deflection of the actuator member 110 causes the deformable membrane 104 to be shaped to provide autofocus functionality. For instance, the actuator member 110 may be actuated such that it deflects downward. The resulting shape of the deformable membrane 104 may refract light passing through the deformable membrane 104 such that the light exits the optical module 500b (e.g., from the bottom and/or image side of the optical module 500b) as indicated in FIG. 5B by the second set of arrows 504b. In some examples, the second set of arrows 504b may indicate a convergence in the path of the light 502 that may provide focus for a camera module (e.g., the camera module 300 described above with reference to FIG. 3 and/or the camera module 700 described below with reference to FIG. 7) that includes the optical module 500a.

Figure 5C:
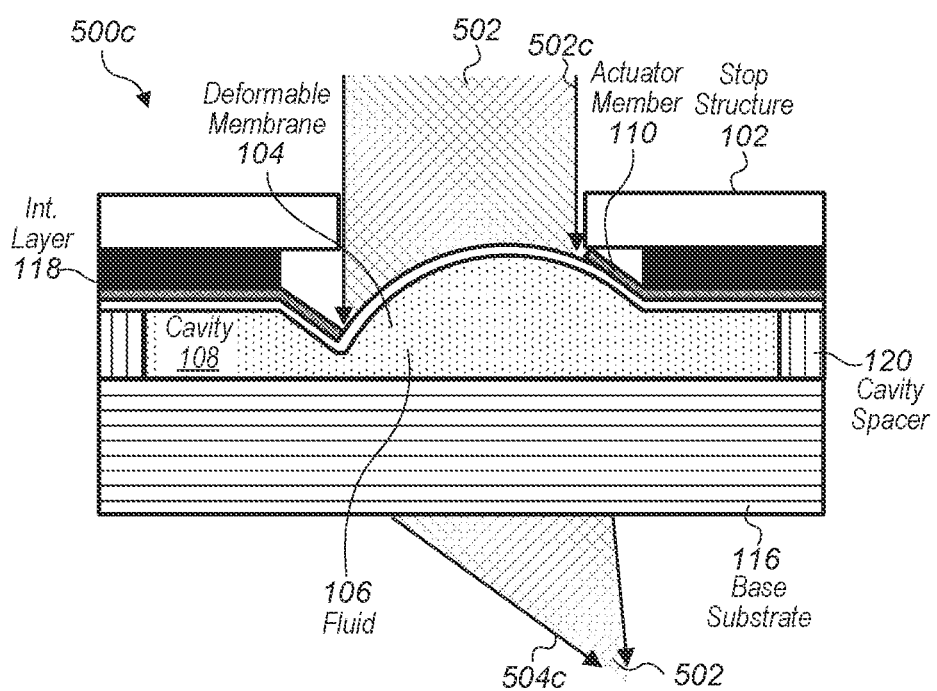
FIG. 5C illustrates a cross-sectional view of an example optical module having a deformable membrane that has been deformed to a state in which the optical module may provide autofocus and optical image stabilization functionality, in accordance with some embodiments. The example optical module of FIG. 5C includes an example stop structure, in accordance with some embodiments.

FIG. 5C illustrates a cross-sectional view of an example optical module 500c having a deformable membrane 104 that has been deformed to a state in which the optical module may provide autofocus and optical image stabilization functionality, in accordance with some embodiments. In various examples, the optical module 500c may be configured in accordance with one or more embodiments of the optical modules 100, 200, and 400a-400d described above with reference to FIGS. 1A-2B and 4A-4D). For instance, in some embodiments, the optical module 500a may include the deformable membrane 104, the fluid 106 enclosed within the cavity 108, the actuator member 110, the stop structure 102, the base substrate 116, the intermediate layer 118, and/or the cavity spacer 120 described above with reference to FIGS. 1A-1B.

In some examples, light 502 may enter the optical module 500c (e.g., from the top and/or object side of the optical module 500c) as indicated in FIG. 5C by the first set of arrows 502c. At least a portion of the actuator member 110 may be actuated such that the resulting deflection of the actuator member 110 causes the deformable membrane 104 to be shaped to provide autofocus and optical image stabilization functionality. For instance, a first portion of the actuator member 110 may be actuated such that it deflects downward and a second portion may be released such that it is in contact with the stop structure 102. The resulting shape of the deformable membrane 104 may refract light passing through the deformable membrane 104 such that the light exits the optical module 500c (e.g., from the bottom and/or image side of the optical module 500c) as indicated in FIG. 5C by the second set of arrows 504c. In some examples, the second set of arrows 504c may indicate a convergence in the path of the light 502 that may provide focus for a camera module (e.g., the camera module 300 described above with reference to FIG. 3 and/or the camera module 700 described below with reference to FIG. 7) that includes the optical module 500c. Furthermore, the second set of arrows 504c may indicate a shift in the path of the light 502 relative to a photosensor (e.g., the photosensor 308 described above with reference to FIG. 3 and/or the image sensor 724 described below with reference to FIG. 7) that may compensate for a movement of the camera module.

Figure 6A:
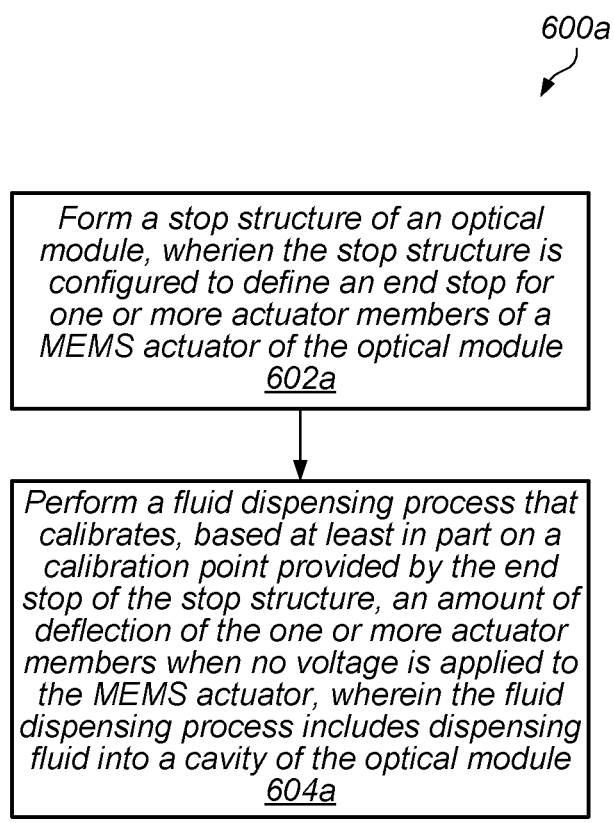
FIG. 6A is a flowchart of an example method of manufacturing an optical module that includes a stop structure, in accordance with some embodiments. The example method of FIG. 6A includes using the stop structure in a fluid dispensing process for calibration purposes, in accordance with some embodiments.

FIG. 6A is a flowchart of an example method 600a of manufacturing an optical module (e.g., an optical module according to one or more embodiments described above with reference to FIGS. 1A-5C) that includes a stop structure, in accordance with some embodiments. The example method 600a includes using the stop structure in a fluid dispensing process for calibration purposes, in accordance with some embodiments.

At 602a, the method 600a may include forming a stop structure of an optical module. The stop structure may be configured to define an end stop for one or more actuator members (also referred to herein as the "actuator member") of an optical microelectromechanical system (MEMS) actuator of the optical module. In some embodiments, the stop structure may be formed using a MEMS etching process. For instance, or more portions of a silicon substrate may be removed during the MEMS etching process to form a desired shape of the stop structure. At 604a, the method 600a may include performing a fluid dispensing process. The fluid dispensing process may calibrate an amount of deflection of the actuator member when no voltage is applied to the MEMS actuator (also referred to herein as the "optical power at 0V").

Figure 6B:
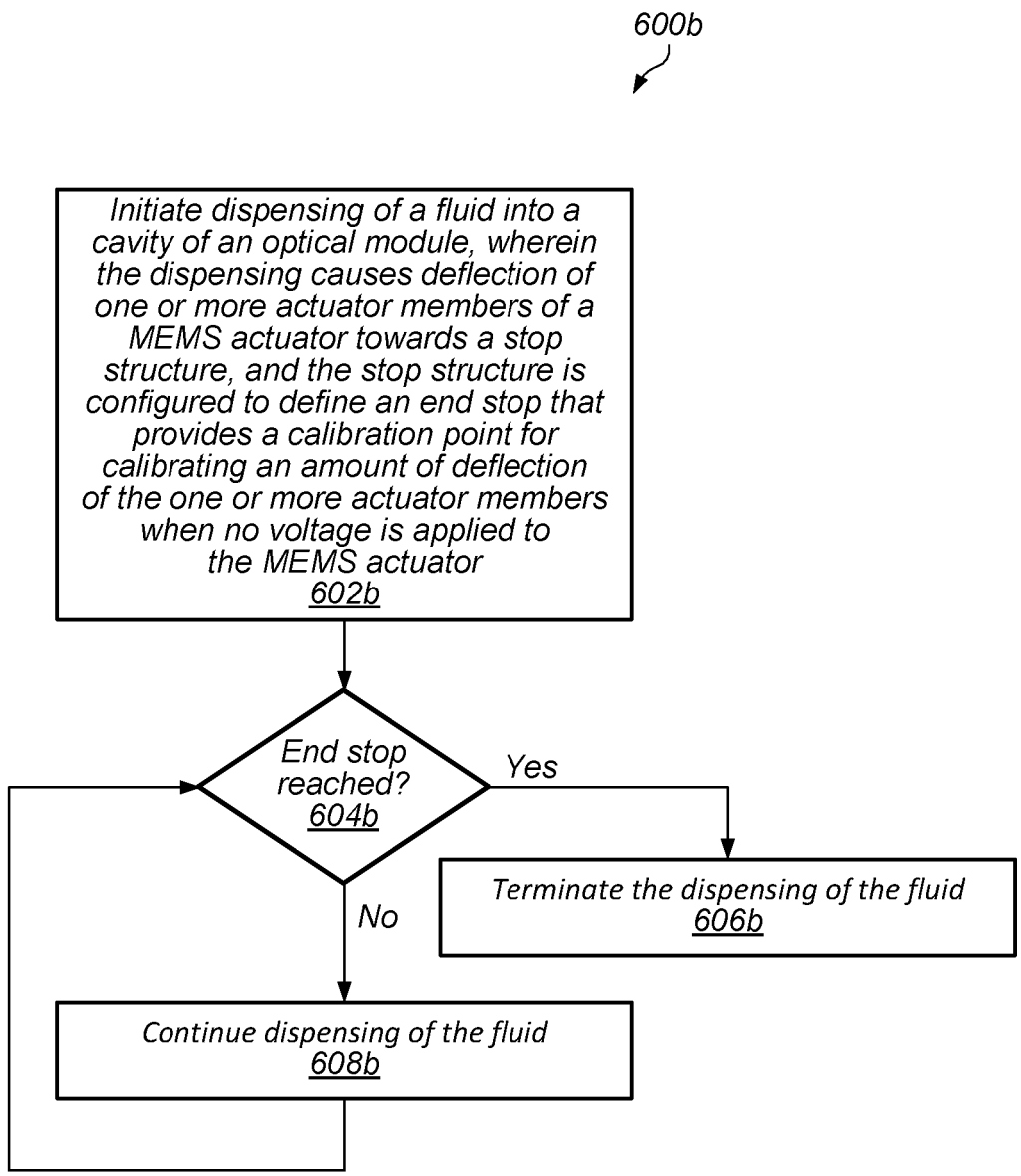
FIG. 6B is a flowchart of an example method of performing a fluid dispensing process on an optical module that includes a stop structure, in accordance with some embodiments. The example method of FIG. 6B includes using the stop structure in the fluid dispensing process for calibration purposes, in accordance with some embodiments.

FIG. 6B is a flowchart of an example method 600b of performing a fluid dispensing process on an optical module (e.g., an optical module according to one or more embodiments described above with reference to FIGS. 1A-5C) that includes a stop structure, in accordance with some embodiments. The example method 600b includes using the stop structure in the fluid dispensing process for calibration purposes, in accordance with some embodiments.

At 602b, the method 600b may include initiating dispensing of a fluid into a cavity of the optical module. Dispensing of the fluid into the cavity may cause deflection of one or more actuator members (also referred to herein as the "actuator member") of an optical microelectromechanical system (MEMS) actuator towards the stop structure. The stop structure may be configured to define an end stop that provides a calibration point for calibrating an amount of deflection of the actuator member such that the optical power at 0V may be known.

At 604b, the method 600b may include determining whether the end stop defined by the stop structure has been reached by the actuator member. For instance, as fluid is dispensed into the cavity of the optical module, the increasing volume of fluid may push the deformable membrane such that at least a portion of the deformable membrane moves towards the stop structure. In turn, the deformable membrane may push the actuator member such that at least a portion of the actuator member moves, or deflects, towards the stop structure. In some examples, determining whether the end stop has been reached by the actuator member includes checking whether the actuator member has come into contact with the stop structure based at least in part on the fluid dispensing. That is, the actuator member may be deemed to have reached the end stop when the actuator member is in contact with the stop structure, and the actuator member may be deemed to have not reached the end stop when the actuator member is not in contact with the stop structure.

If, at 604b, it is determined that the end stop defined by the stop structure has been reached by the actuator member, then the method 600b may include terminating the dispensing of the fluid into the cavity of the optical module, at 606b.

If, at 604b, it is determined that the end stop has not been reached by the actuator member, then the method 600b may include continuing dispensing of the fluid into the cavity of the optical module. In some examples, dispensing of the fluid may continue until it is determined that the end stop has been reached by the actuator.

In some embodiments, the stop structure and other components of the optical module may be configured such that using the stop structure as a calibration point in the fluid dispensing process results in a particular optical power at 0V (e.g., 1 diopter) regardless of other factors such as stress and thickness that would otherwise typically impact the optical power at 0V. In some examples, the optical power at 0V may be determined for an optical module after the stop structure is used as a calibration point in the fluid dispensing process. By using the stop structure as a calibration point, the production accuracy of the optical module may be improved which may result in an increase in the useful diopter range of the optical module and/or may allow for a more compact optical module design. As a non-limiting example, an improvement in the production accuracy of the optical module based on using the stop structure as a calibration point in the fluid dispensing process may result in a gain of about 1 diopter that may be used to increase the useful diopter range from about 4 diopters to about 5 diopters. As another non-limiting example, an improvement in the production accuracy of the optical module based on using the stop structure as a calibration point in the fluid dispensing process may allow for a more compact optical module design having a reduced tolerance budget due to a reduction in diopter variation (e.g., a reduction of from about a 12.25 diopter variation to about 11.25 diopter variation).

Figure 7:
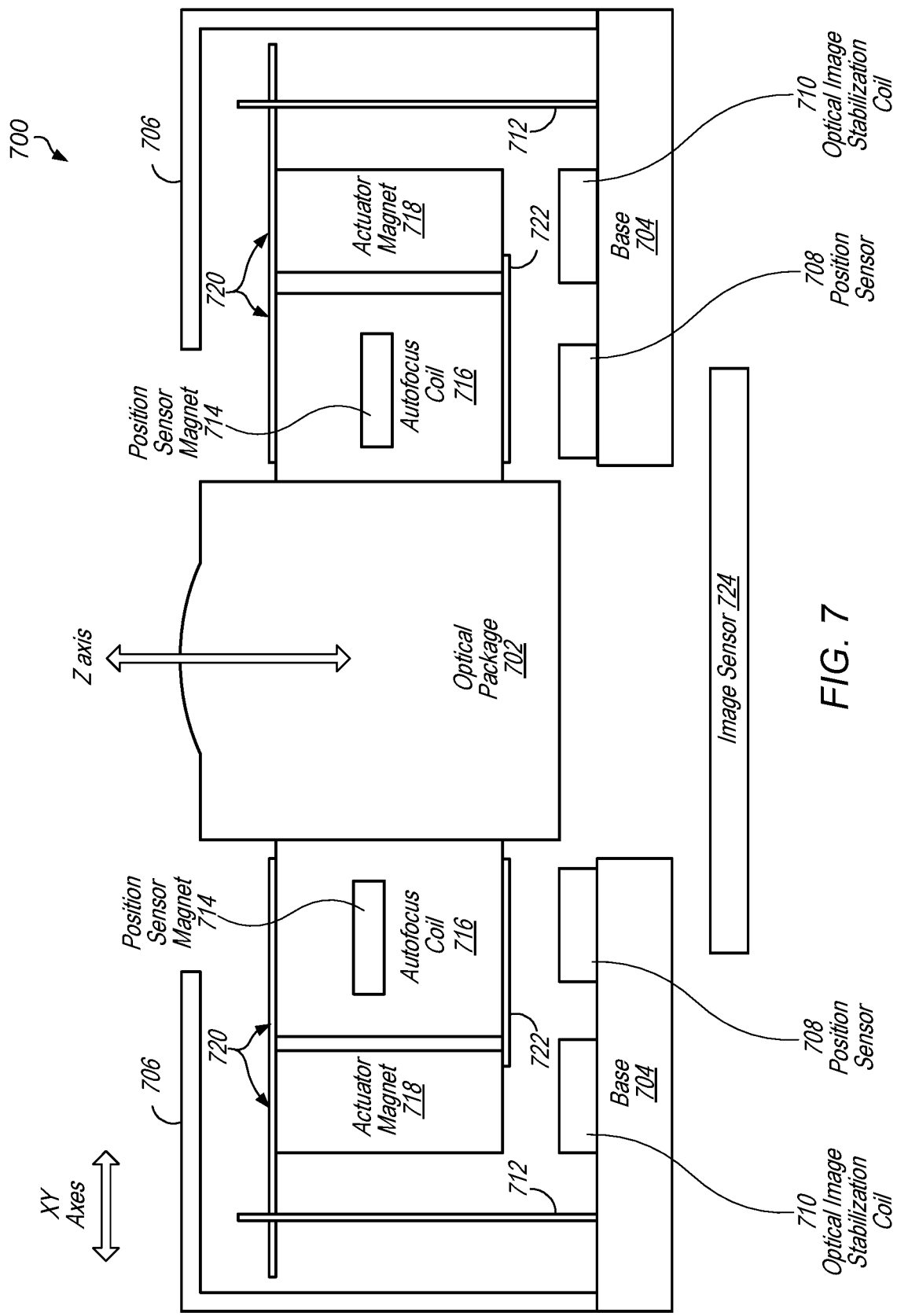
FIG. 7 illustrates a schematic side view of an example camera module having an example voice coil motor (VCM) actuator for moving an optical package, in accordance with some embodiments.

FIG. 7 illustrates a schematic side view of an example camera module 700 having an example voice coil motor (VCM) actuator for moving an optical package, in accordance with some embodiments. In some embodiments, the example camera module 700 may include one or more optical modules (e.g., in accordance with one or more embodiments of the optical modules 100, 200, 400a-400d, and 500a-500c described above with reference to FIGS. 1A-2B and 4A-5C). As shown in FIG. 7, the camera module 700 may include a base or substrate 704 and a cover 706. The base 704 may include and/or support one or more position sensors (e.g., Hall sensors, TMR sensors, GMR sensors, etc.) 708, one or more optical image stabilization coils 710, and one or more suspension wires 712, which may at least partly enable magnetic sensing for autofocus and/or optical image stabilization position detection, e.g., by detecting movements of position sensor magnets 714.

In some embodiments, the actuator 700 may include one or more autofocus coils 716 and one or more actuator magnets 718, which may at least partly enable autofocus functionality such as moving the optical package 702 along the z axis and/or along an optical axis defined by one or more lenses of the optical package 702. In some examples, at least one position sensor magnet 714 may be disposed proximate to at least one autofocus coil 716. In some embodiments, at least one position sensor magnet 714 may be coupled to at least one autofocus coil 716. For instance, the autofocus coils 716 may each define a central space that is encircled by the respective autofocus coil 716. The position sensor magnets 714 may be disposed within the central spaces encircled by the autofocus coils 716. Additionally or alternatively, the position sensor magnets 714 may be attached to support structures (not shown) that are fixed to the autofocus coils 716. For example, a support structure, to which a position sensor magnet 714 is attached, may be disposed within a central space encircled by an autofocus coil 716 and the support structure may be fixed to the autofocus coil 716.

In some embodiments, the actuator 700 may include four suspension wires 712. The optical package 702 may be suspended with respect to the base 704 by suspending one or more upper springs 720 on the suspension wires 712. In some embodiments, the actuator may include one or more lower springs 722. In the optical package 702, an optics component (e.g., one or more lens elements, a lens assembly, etc.) may be screwed, mounted or otherwise held in or by an optics holder. Note that upper spring(s) 720 and lower spring(s) 722 may be flexible to allow the optical package 702 a range of motion along the Z (optical) axis for optical focusing, and suspension wires 712 may be flexible to allow a range of motion on the x-y plane orthogonal to the optical axis for optical image stabilization. Also note that, while embodiments show the optical package 702 suspended on wires 712, other mechanisms may be used to suspend the optical package 702 in other embodiments.

In various embodiments, the camera module may include an image sensor 724. The image sensor 724 may be disposed below the optical package 702 such that light rays may pass through one or more lens elements of the optical package 702 (e.g., via an aperture at the top of the optical package 702) and to the image sensor 724.

In some embodiments, one or more optical modules (not shown) may be disposed above the optical package 702 and/or below the optical package 702 (e.g., between the optical package 702 and the image sensor 724. The optical module(s) may be configured to complement and/or supplement the autofocus and/or optical image stabilization functionality provided to the camera module 700 by the VCM actuator.

Figure 8:
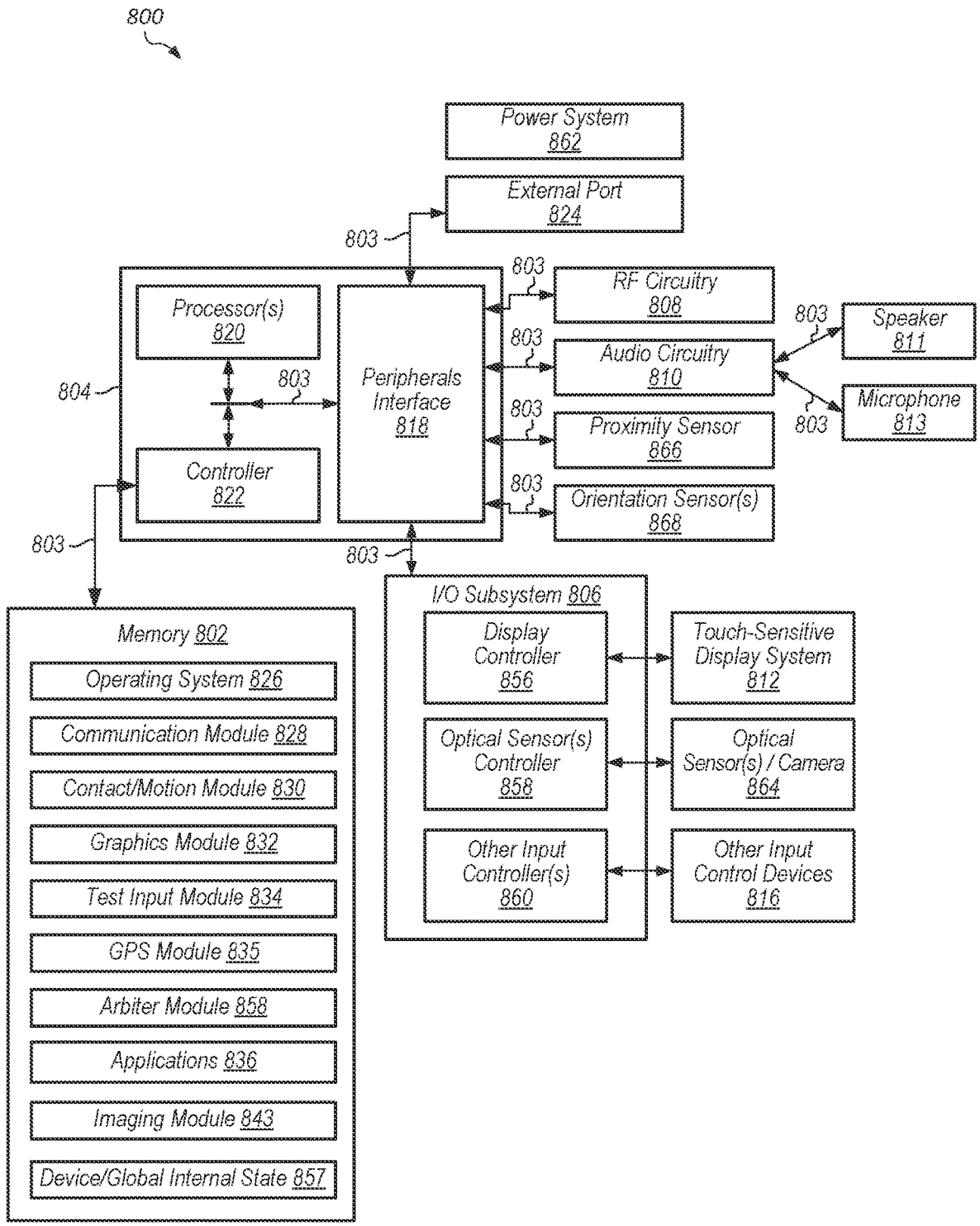
FIG. 8 illustrates a block diagram of an example portable multifunction device that may include an optical module and/or a camera module, in accordance with some embodiments.

FIG. 8 illustrates a block diagram of an example portable multifunction device that may include an optical module (e.g., one or more of the optical modules described above with reference to FIGS. 1A-7) and/or a camera module (e.g., the camera module described above with reference to FIG. 3), in accordance with some embodiments. Camera(s) 864 is sometimes called an "optical sensor" for convenience, and may also be known as or called an optical sensor system. Device 800 may include memory 802 (which may include one or more computer readable storage mediums), memory controller 822, one or more processing units (CPUs) 820, peripherals interface 818, RF circuitry 808, audio circuitry 810, speaker 811, touch-sensitive display system 812, microphone 813, input/output (I/O) subsystem 806, other input or control devices 816, and external port 824. Device 800 may include one or more optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 811, and microphone 813 provide an audio interface between a user and device 800. Audio circuitry 810 receives audio data from peripherals interface 818, converts the audio data to an electrical signal, and transmits the electrical signal to speaker 811. Speaker 811 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 802 and/or RF circuitry 808 by peripherals interface 818. In some embodiments, audio circuitry 810 also includes a headset jack (e.g., 912, FIG. 9). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternate embodiments, input controller(s) 860 may be coupled to any (or none) of the following: a keyboard, infrared port, USB port, and a pointer device such as a mouse. The one or more buttons (e.g., 908, FIG. 9) may include an up/down button for volume control of speaker 811 and/or microphone 813. The one or more buttons may include a push button (e.g., 906, FIG. 9).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology is used.

Touch screen 812 may have a video resolution in excess of 800 dpi. In some embodiments, the touch screen has a video resolution of approximately 860 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor 864 coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with an imaging module (also called a camera module), optical sensor 864 may capture still images or video. In some embodiments, an optical sensor 864 is located on the back of device 800, opposite touch screen display 812 on the front of the device, so that the touch screen display 812 may be used as a viewfinder for still and/or video image acquisition. In some embodiments, another optical sensor is located on the front of the device so that the user's image may be obtained for videoconferencing while the user views the other video conference participants on the touch screen display.

Device 800 may also include one or more proximity sensors 866. FIG. 8 shows proximity sensor 866 coupled to peripherals interface 818. Alternately, proximity sensor 866 may be coupled to input controller 860 in I/O subsystem 806. In some embodiments, the proximity sensor 866 turns off and disables touch screen 812 when the multifunction device 800 is placed near the user's ear (e.g., when the user is making a phone call).

Device 800 includes one or more orientation sensors 868. In some embodiments, the one or more orientation sensors 868 include one or more accelerometers (e.g., one or more linear accelerometers and/or one or more rotational accelerometers). In some embodiments, the one or more orientation sensors 868 include one or more gyroscopes. In some embodiments, the one or more orientation sensors 868 include one or more magnetometers. In some embodiments, the one or more orientation sensors 868 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors 868 include any combination of orientation/rotation sensors. FIG. 8 shows the one or more orientation sensors 868 coupled to peripherals interface 818. Alternately, the one or more orientation sensors 868 may be coupled to an input controller 860 in I/O subsystem 806. In some embodiments, information is displayed on the touch screen display 812 in a portrait view or a landscape view based on an analysis of data received from the one or more orientation sensors 868.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, arbiter module 858 and applications (or sets of instructions) 836. Furthermore, in some embodiments memory 802 stores device/global internal state 857. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or to drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 830 may detect contact with touch screen 812 (in conjunction with display controller 856) and other touch sensitive devices (e.g., a touchpad or physical click wheel). In some embodiments, contact/motion module 830 and display controller 856 detect contact on a touchpad. Contact/motion module 830 may detect a gesture input by a user. Different gestures on the touch-sensitive surface have different contact patterns. Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 834, which may be a component of graphics module 832, provides soft keyboards for entering text in various applications (e.g., contacts, e-mail, and any other application that needs text input). GPS module 835 determines the location of the device and provides this information for use in various applications 836 (e.g., to a camera application as picture/video metadata).

Applications 836 may include one or more modules (e.g., a contacts module, an email client module, a camera module for still and/or video images, etc.) Examples of other applications 836 that may be stored in memory 802 include other word processing applications, other image editing applications, drawing applications, presentation applications, JAVA-enabled applications, encryption, digital rights management, voice recognition, and voice replication. Each of the modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

Figure 9:
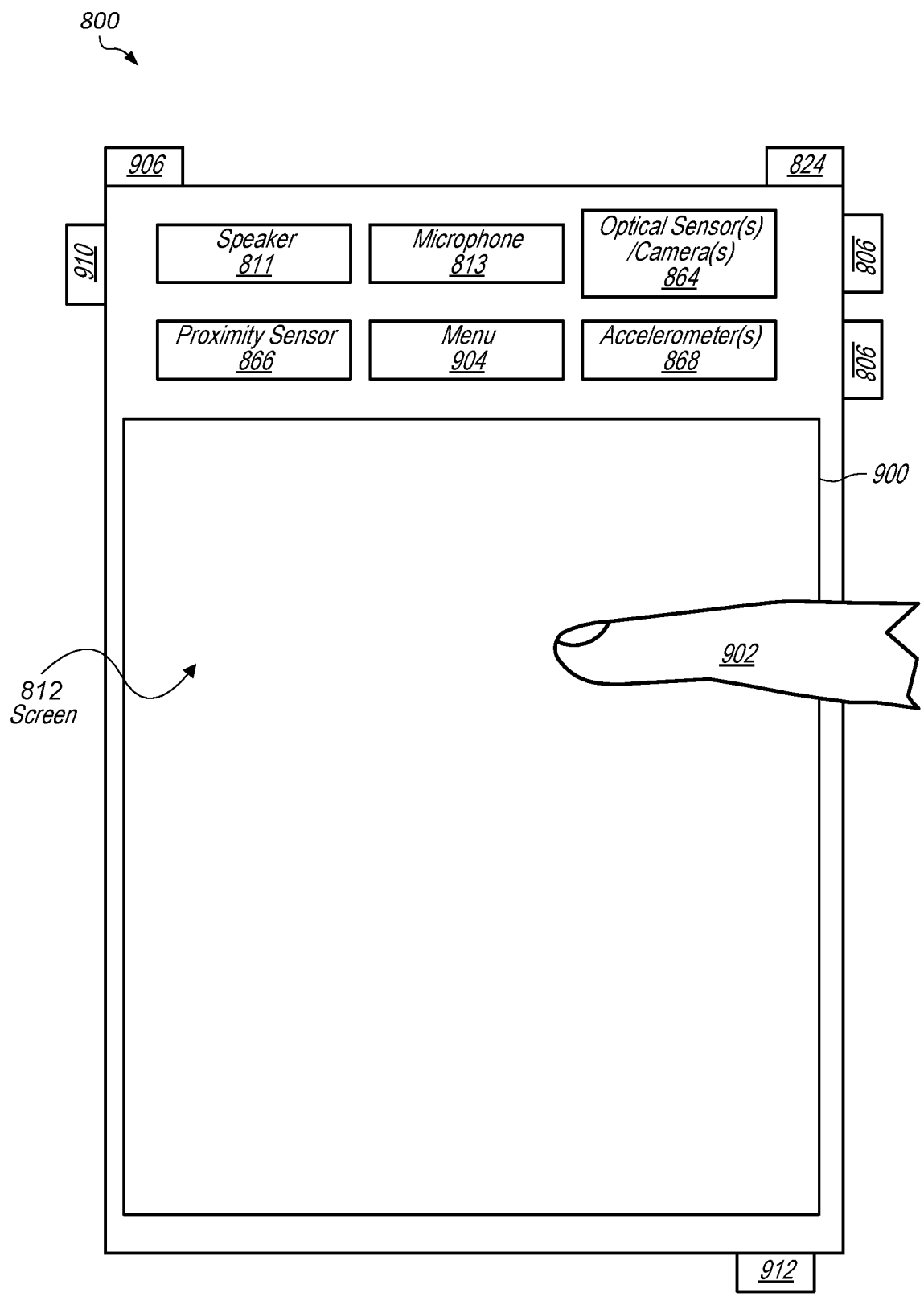
FIG. 9 illustrates an example portable multifunction device that may include an optical module and/or a camera module, in accordance with some embodiments.

FIG. 9 illustrates an example portable multifunction device 800 that may include an optical module (e.g., one or more of the optical modules described above with reference to FIGS. 1A-7) and/or a camera module (e.g., the camera module described above with reference to FIG. 3), in accordance with some embodiments. The device 800 may include a touch screen 812. The touch screen 812 may display one or more graphics within user interface (UI) 900. In this embodiment, as well as others described below, a user may select one or more of the graphics by making a gesture on the graphics, for example, with one or more fingers 902 (not drawn to scale in the figure) or one or more styluses (not shown).

Device 800 may also include one or more physical buttons, such as "home" or menu button 904. As described previously, menu button 904 may be used to navigate to any application 836 in a set of applications that may be executed on device 800. Alternatively, in some embodiments, the menu button 904 is implemented as a soft key in a GUI displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 912, and docking/charging external port 824. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor/camera 864 (on the front of a device), a rear-facing camera or optical sensor that is pointed opposite from the display may be used instead of or in addition to an optical sensor/camera 864 on the front of a device.

Figure 10:
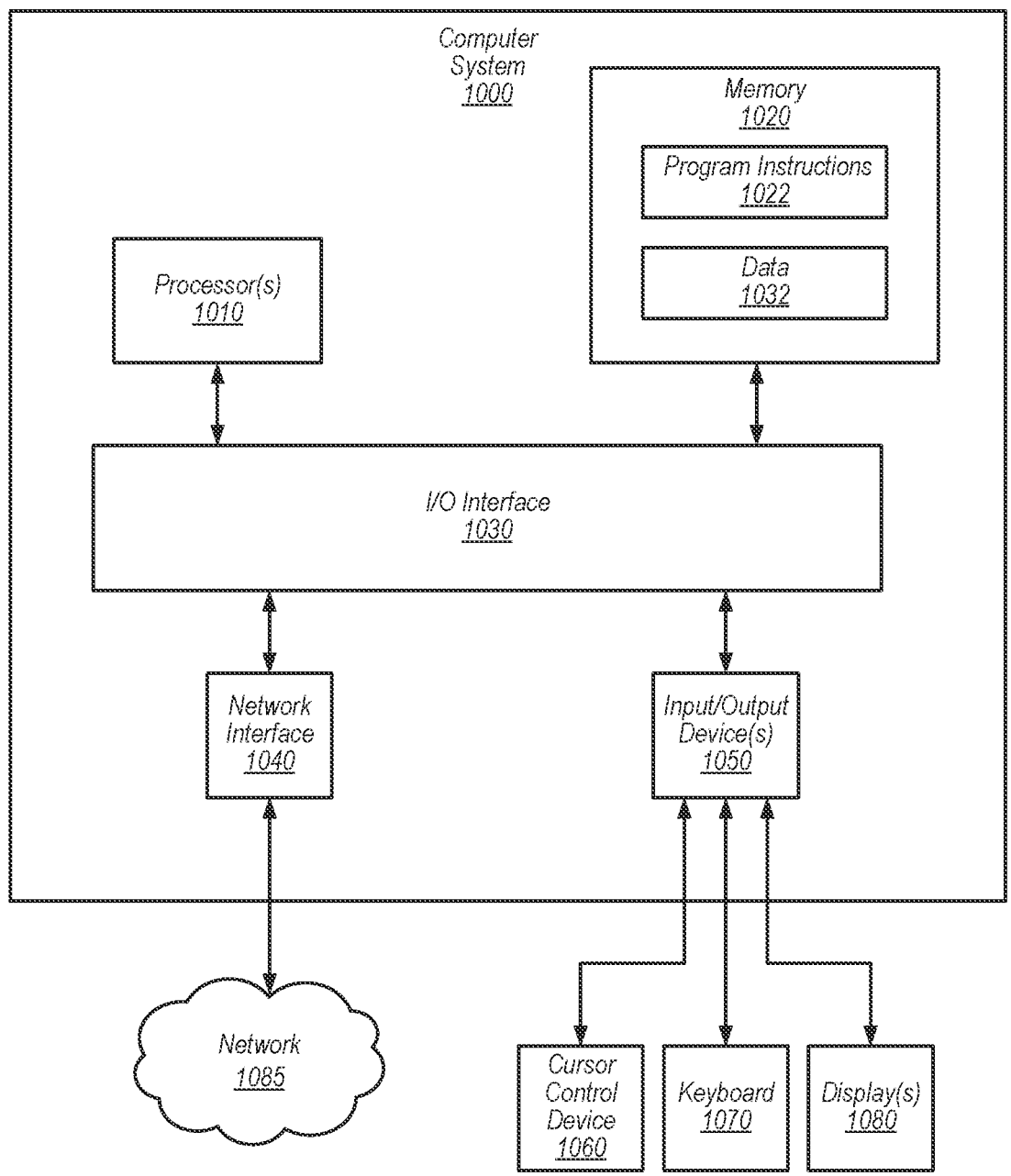
FIG. 10 illustrates an example computer system that may include an optical module and/or a camera module, in accordance with some embodiments.

FIG. 10 illustrates an example computer system 1000 that may include an optical module (e.g., one or more of the optical modules described above with reference to FIGS. 1A-7) and/or a camera module (e.g., the camera module described above with reference to FIG. 3), in accordance with some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 (e.g., comprising camera control program instructions) and/or data 1032 (e.g., comprising camera control data) accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a lens control application incorporating any of the functionality described above. Additionally, existing data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical module, comprising:
   a deformable membrane;
   fluid enclosed within a cavity, the cavity at least partially defined by the deformable membrane;
   one or more actuator members configured to be deflectable to cause displacement of the fluid such that at least a portion of the deformable membrane deforms to alter light passing through the optical module, wherein the one or more actuator members comprise a piezoelectric material and extend to a periphery of the one or more actuator members;
   an intermediate layer configured to provide spacing between the one or more actuator members and one or more stop structures, having a surface orthogonal to an optical axis of the optical module, wherein the periphery of the one or more actuator members extends inward beyond the intermediate layer to contact a portion of the stop structure at the surface orthogonal to the optical axis of the optical module; and
   the one or more stop structures configured to mechanically stop travel of the periphery of the one or more actuator members from deflecting beyond a threshold deflection in at least one direction when the periphery of the one or more actuator members contacts the surface orthogonal to the optical axis of the one or more stop structures, wherein the one or more actuator members are positioned, with respect to the at least one direction, between the deformable membrane and the one or more stop structures.

2. The optical module of claim 1, wherein at least a portion of the one or more stop structures is configured to define an aperture stop that limits an amount of light that passes through the optical module.

3. The optical module of claim 2, wherein:
   the one or more stop structures include a silicon substrate; and
   the one or more stop structures include an antireflective coating on at least a portion of the silicon substrate.

4. The optical module of claim 1, further comprising:
   one or more intermediate layers disposed between the one or more actuator members and the one or more stop structures;
   wherein the one or more intermediate layers are configured to provide spacing, based at least in part on the threshold deflection, between the one or more actuator members and the one or more stop structures.

5. The optical module of claim 1, further comprising:
   a base substrate;
   wherein the cavity is further at least partially defined by the base substrate.

6. The optical module of claim 5, wherein:
   the base substrate is a glass substrate; and
   the one or more stop structures include a silicon substrate.

7. The optical module of claim 6, wherein:
   at least a portion of the one or more stop structures is planar and defines a first plane; and
   at least a portion of the base substrate is planar and defines a second plane that is parallel to the first plane.

8. The optical module of claim 1, wherein:
   the one or more stop structures are configured to hide the one or more actuator members when the optical module is viewed in plan.

9. The optical module of claim 1, wherein:
   the one or more actuator members are part of an optical microelectromechanical system (MEMS) actuator;
   the threshold deflection corresponds to a deflection position of the one or more actuator members in a first direction when no voltage is applied to the MEMS actuator; and
   application of a voltage to the one or more actuator members causes the one or more actuator members to deflect in a second direction that is opposite the first direction.

10. A mobile multifunction device, comprising:
    a camera, including:
      a photosensor configured to capture light projected onto a surface of the photosensor;
      an optical module, including:
        one or more flexible lens elements;
        fluid enclosed within a cavity, the cavity at least partially defined by at least one of the one or more flexible lens elements;
        one or more actuator members configured to travel in at least one direction to cause displacement of the fluid such that at least a portion of the at least one of the one or more flexible lens elements deforms to alter light passing through the optical module, wherein the one or more actuator members form a first periphery configured to lead the travel of the one or more actuator members, and wherein the one or more actuator members comprise a piezoelectric material; and one or more stop structures configured to provide one or more end stops that limit the travel of the one or more actuator members when the piezoelectric material contacts the one or more stop structures, wherein the one or more actuator members are positioned, with respect to the at least one direction, between the one or more flexible lens elements and the one or more stop structures, and wherein at least a portion of the one or more stop structures form a second periphery configured to provide a corresponding end stop that limits the travel of the one or more actuator members when the first periphery of the one or more actuator members directly contacts a surface of the second periphery of the one or more stop structures; and one or more lens elements within a body of the camera, wherein the one or more lens elements define an optical axis;

wherein:
the one or more flexible lens elements of the optical module are disposed along the optical axis;
the one or more lens elements and the one or more flexible lens elements are part of a lens system that is configured to refract light from an object field located in front of the camera to form an image of a scene at an image plane at or near the surface of the photosensor; and a display for presenting the image.

11. The mobile multifunction device of claim 10, wherein at least a portion of the one or more stop structures is configured to define an aperture stop that limits an amount of light that passes through the optical module.

12. The mobile multifunction device of claim 10, wherein:
the one or more flexible lens elements include a deformable membrane that at least partially defines a top portion of the cavity; and
the optical module further includes a base substrate that at least partially defines a bottom portion of the cavity that is opposite the top portion.

13. The mobile multifunction device of claim 10, wherein the one or more flexible lens elements include:
a first deformable membrane that at least partially defines a top portion of the cavity; and
a second deformable membrane that at least partially defines a bottom portion of the cavity that is opposite the top portion.

14. The mobile multifunction device of claim 10, wherein:
the one or more stop structures include one or more locally shaped mechanical stops that provide one or more discrete end stops that limit the travel of the one or more actuator members when at least one portion of the one or more actuator members contacts the one or more locally shaped mechanical stops.

15. The mobile multifunction device of claim 10, wherein:
the one or more actuator members are configured to deflect in a first direction when actuated; and the one or more stop structures are configured to limit deflection of the one or more actuator members in a second direction that is opposite the first direction.

16. The mobile multifunction device of claim 10, wherein:
the one or more actuator members are configured to deflect in a particular direction when actuated; and
the one or more stop structures are configured to limit deflection of the one or more actuator members in the particular direction.

17. A method of manufacturing an optical module, the method comprising:
forming a stop structure of the optical module, wherein the stop structure configured to define an end stop for one or more actuator members of an optical microelectromechanical system (MEMS) actuator of the optical module, and the end stop provides a calibration point for calibrating an amount of deflection of the one or more actuator members when no voltage is applied to the MEMS actuator;
performing a fluid dispensing process that calibrates, based at least in part on the calibration point provided by the end stop of the stop structure, the amount of deflection of the one or more actuators members when no voltage is applied to the MEMS actuator, wherein the performing the fluid dispensing process includes:
initiating dispensing of a fluid into a cavity of the optical module, wherein:
the cavity is at least partially defined by a deformable membrane of the optical module, the deformable membrane adjacent to the one or more actuator members; and
the dispensing of the fluid into the cavity causes deflection of the one or more actuator members towards the stop structure;
determining that the dispensing of the fluid has caused the one or more actuator members to contact the stop structure; and
terminating the dispensing of the fluid at least partly responsive to the determining that the dispensing of the fluid has caused the one or more actuator members to contact the stop structure; and
wherein the one or more actuator members are configured to be deflectable, responsive to application of a voltage to the MEMS actuator, away from the stop structure to cause displacement of the fluid such that at least a portion of the deformable membrane deforms to alter light passing through the optical module.

18. The method of claim 17, wherein:
the forming the stop structure includes etching a substrate to form a desired shape of the stop structure; and
at least one of the desired shape of the stop structure or a position of the stop structure relative to the one or more actuator members is determined based at least in part on a desired optical power that is to be achieved by the optical module when no voltage is applied to the MEMS actuator.

19. The method of claim 17, wherein a nominal diopter range of the optical module is at least five diopters.

* * * * *